US012678938B2

(12) United States Patent
Hvass et al.

(10) Patent No.: US 12,678,938 B2
(45) Date of Patent: Jul. 14, 2026

(54) AUTOMATED MULTI-ARM ROBOTIC SYSTEM

(71) Applicant: Plus One Robotics, Inc., San Antonio, TX (US)

(72) Inventors: Paul Hvass, San Antonio, TX (US); Matthew Henry Churchill, San Antonio, TX (US); Christopher Naville, San Antonio, TX (US)

(73) Assignee: Plus One Robotics, Inc., San Antonio, TX (US)

( * ) Notice: Subject to any disclaimer, the term of this patent is extended or adjusted under 35 U.S.C. 154(b) by 0 days.

(21) Appl. No.: 18/776,860

(22) Filed: Jul. 18, 2024

(65) Prior Publication Data

US 2025/0170703 A1 May 29, 2025

Related U.S. Application Data

(63) Continuation-in-part of application No. 18/402,653, filed on Jan. 2, 2024.

(Continued)

(51) Int. Cl.
B25J 9/00 (2006.01)

(52) U.S. Cl.
CPC ........... B25J 9/0084 (2013.01); B25J 9/0093 (2013.01)

(58) Field of Classification Search
CPC ........ B25J 5/007; B25J 19/023; B25J 19/022; B25J 19/026; B25J 5/005; B25J 9/0084;

(Continued)

(56) References Cited

U.S. PATENT DOCUMENTS

| 2,961,085 A | 11/1960 | Stovall |
| 3,357,539 A | 12/1967 | Naslund |

(Continued)

FOREIGN PATENT DOCUMENTS

| CA | 2080615 A1 | 4/1993 |
| EP | 2277020 B2 | 1/2011 |

(Continued)

OTHER PUBLICATIONS

Molnár et a., Flexible control and monitoring system design initiative based on Industry 4.0 principles, 2020, IEEE, p. 1-6 (Year: 2020).*

(Continued)

*Primary Examiner* — Mcdieunel Marc
(74) *Attorney, Agent, or Firm* — Outlier Patent Attorneys, PLLC

(57) ABSTRACT

A conveyance system includes an in-feed conveyor for conveying a high density flow of a plurality of parcels. The system further includes a first pick conveyor configured for being selectively activated and deactivated in order to space out the plurality of parcels and turn the high density flow into a low density flow of parcels. A second pick conveyor is in series with and downstream of the first pick conveyor. The system further includes a first place conveyor and a second place conveyor in series with and downstream of the first place conveyor. A first robot is configured for transferring parcels from the first pick conveyor to the first place conveyor. A second robot is configured for transferring parcels from the second pick conveyor to the second place conveyor. As such, robots each have their own dedicated workspace and do not interfere with each other.

20 Claims, 15 Drawing Sheets

Related U.S. Application Data

(60) Provisional application No. 63/536,687, filed on Sep. 5, 2023, provisional application No. 63/436,361, filed on Dec. 30, 2022.

(58) Field of Classification Search
CPC ........ B25J 9/0093; B65G 43/02; B65G 39/10; B65G 15/00; B65G 43/00
See application file for complete search history.

(56) References Cited

U.S. PATENT DOCUMENTS

| | | | |
|---|---|---|---|
| 3,566,984 A | 3/1971 | Weickhardt | |
| 4,227,607 A | 10/1980 | Malavenda | |
| 4,634,328 A | 1/1987 | Carrell | |
| 4,789,295 A | 12/1988 | Boucher, Jr. et al. | |
| 5,038,911 A | 8/1991 | Doane et al. | |
| 5,040,056 A | 8/1991 | Sager et al. | |
| 5,475,965 A | 12/1995 | Mondini | |
| 6,377,867 B1 | 4/2002 | Bradley et al. | |
| 6,471,044 B1 | 10/2002 | Isaacs et al. | |
| 7,051,863 B2 | 5/2006 | Fujimura et al. | |
| 7,076,335 B2 | 7/2006 | Seemann | |
| 7,413,071 B2 | 8/2008 | Zeitler et al. | |
| 8,770,376 B2 | 7/2014 | Takens | |
| 8,965,563 B2 | 2/2015 | Eldershaw et al. | |
| 8,997,438 B1* | 4/2015 | Fallas | B25J 9/0093 901/17 |
| 9,359,150 B2 | 6/2016 | Jodoin et al. | |
| 9,399,297 B2 | 7/2016 | Cho | |
| 9,481,516 B1* | 11/2016 | Kraus | B65G 47/82 |
| 9,492,924 B2* | 11/2016 | Bradski | B25J 9/163 |
| 9,555,447 B2 | 1/2017 | Lykkegaard et al. | |
| 9,637,318 B2* | 5/2017 | Messina | B65G 41/005 |
| 9,771,222 B2 | 9/2017 | Schroader | |
| 10,005,107 B2 | 6/2018 | Ogusu et al. | |
| 10,086,510 B1* | 10/2018 | McAninch | B65B 35/24 |
| 10,301,122 B2 | 5/2019 | Moroni et al. | |
| 10,343,857 B2* | 7/2019 | Morency | B65G 61/00 |
| 10,427,884 B2 | 10/2019 | Schroader | |
| 10,507,975 B2 | 12/2019 | Thomas et al. | |
| 10,646,898 B2 | 5/2020 | Hillerich, Jr. et al. | |
| 10,730,078 B2 | 8/2020 | Wagner et al. | |
| 10,792,706 B2 | 10/2020 | Wagner et al. | |
| 10,807,808 B1* | 10/2020 | Rodgers | B25J 9/0093 |
| 10,875,057 B2 | 12/2020 | Wagner et al. | |
| 10,981,736 B2 | 4/2021 | Morency et al. | |
| 10,988,327 B1 | 4/2021 | Layne et al. | |
| 10,994,309 B2 | 5/2021 | Hillerich, Jr. et al. | |
| 11,213,949 B2 | 1/2022 | Wagner et al. | |
| 11,241,802 B2 | 2/2022 | Douglas et al. | |
| 11,285,605 B2 | 3/2022 | Douglas et al. | |
| 11,416,695 B2 | 8/2022 | Wagner et al. | |
| 11,524,403 B2 | 12/2022 | Douglas et al. | |
| 11,548,739 B1* | 1/2023 | Mao | B65G 47/90 |
| 11,717,975 B1 | 8/2023 | Receveur et al. | |
| 11,753,256 B2 | 9/2023 | Patil et al. | |
| 11,806,880 B2* | 11/2023 | Chavez | B25J 9/1687 |
| 11,813,758 B2 | 11/2023 | Chavez et al. | |
| 11,820,599 B2* | 11/2023 | Kopecko | B25J 9/0093 |
| 11,851,293 B2 | 12/2023 | Graston et al. | |
| 11,945,003 B2 | 4/2024 | Wagner et al. | |
| 12,059,803 B2* | 8/2024 | Gandhi | B25J 9/0018 |
| 12,112,229 B2 | 10/2024 | Wagner et al. | |
| 12,116,216 B2 | 10/2024 | Faieta et al. | |
| 12,515,887 B2 | 1/2026 | Uriarte | |
| 2007/0237356 A1 | 10/2007 | Dwinell et al. | |
| 2008/0093201 A1 | 4/2008 | Wanner et al. | |
| 2009/0065330 A1 | 3/2009 | Lupton et al. | |
| 2009/0159404 A1 | 6/2009 | Schroader | |
| 2010/0155194 A1 | 6/2010 | Schafer | |
| 2011/0170998 A1 | 7/2011 | Winkler | |
| 2013/0173051 A1 | 7/2013 | Bellante | |
| 2013/0319818 A1 | 12/2013 | Worz | |
| 2014/0111615 A1 | 4/2014 | McGuire et al. | |

| | | | |
|---|---|---|---|
| 2014/0166550 A1 | 6/2014 | Berdelle-Hilge | |
| 2014/0291112 A1 | 10/2014 | Lyon et al. | |
| 2014/0332344 A1 | 11/2014 | Jodoin et al. | |
| 2015/0134110 A1 | 5/2015 | Koyanagi et al. | |
| 2015/0209831 A1 | 7/2015 | Wargo | |
| 2016/0083198 A1 | 3/2016 | Nishizaka et al. | |
| 2016/0130086 A1 | 5/2016 | Yamashita | |
| 2016/0243590 A1 | 8/2016 | Crest et al. | |
| 2017/0087718 A1 | 3/2017 | Wagner et al. | |
| 2018/0056335 A1 | 3/2018 | Ogusu et al. | |
| 2018/0148272 A1 | 5/2018 | Wagner et al. | |
| 2018/0164788 A1 | 6/2018 | Shimamura et al. | |
| 2018/0215551 A1 | 8/2018 | Thomas et al. | |
| 2018/0345324 A1 | 12/2018 | Hillerich, Jr. et al. | |
| 2019/0070728 A1* | 3/2019 | Wertenberger | B25J 9/1697 |
| 2019/0145798 A1 | 5/2019 | Kamiya et al. | |
| 2019/0367277 A1 | 12/2019 | Sigrist | |
| 2020/0031593 A1 | 1/2020 | Usami et al. | |
| 2020/0115161 A1 | 4/2020 | Thomas et al. | |
| 2020/0216262 A1 | 7/2020 | Sigrist | |
| 2021/0001491 A1* | 1/2021 | Strouse | B23Q 7/048 |
| 2021/0122056 A1 | 4/2021 | Menon et al. | |
| 2021/0237990 A1 | 8/2021 | Morency et al. | |
| 2021/0395023 A1 | 12/2021 | Patil et al. | |
| 2022/0289502 A1 | 9/2022 | Sun et al. | |
| 2022/0371834 A1 | 11/2022 | Graston et al. | |
| 2023/0001569 A1* | 1/2023 | Gandhi | B25J 13/08 |
| 2023/0139689 A1* | 5/2023 | Edwards | B25J 9/1664 700/259 |
| 2023/0150777 A1* | 5/2023 | Skyum | B65G 47/918 700/245 |
| 2023/0202760 A1 | 6/2023 | Yamashita et al. | |
| 2024/0017399 A1* | 1/2024 | Rest | B25J 9/0093 |
| 2024/0217756 A1* | 7/2024 | Hvass | B65G 47/907 |

FOREIGN PATENT DOCUMENTS

| | | |
|---|---|---|
| JP | 2012184102 A | 9/2012 |
| JP | 2015040118 A | 3/2015 |
| KR | 102290526 B1 | 8/2021 |
| WO | 9314008 A1 | 7/1993 |
| WO | 2016102822 A1 | 6/2016 |
| WO | 2021198053 A1 | 10/2021 |
| WO | 2024145692 A1 | 7/2024 |

OTHER PUBLICATIONS

Lubiński et al., Conveyor—different approaches based on student-made models, 2011, IEEE, p. 1393-1396 (Year: 2011).*

Ali et al., Multi machine operation with product sorting and elimination of defective product along with packaging by their colour and dimension with speed control of motors, 2017, IEEE, p. 1-6 (Year: 2017).*

Singh et al., Automatic sorting of object by their colour and dimension with speed or process control of induction motor 2017, IEEE, p. 1-6 (Year: 2017).*

Ali et al., Multi machine operation with product sorting and elimination of defective product along with packaging by their colour and dimension with speed control of motors, 2017, IEEE, pg., 1-6 (Year: 2017).*

Salcic et al., A framework for designing dynamic and interoperable automation and robotics systems, 2017, IEEE, pg., 683-686 ( Year: 2017).*

Ali et al., Automatic multi machine operation with product sorting and packaging by their colour and dimension with speed control of motors, 2017, IEEE, pg., 88-92 (Year: 2017).*

PCT International Search Report and Written Opinion dated Apr. 26, 2024, PCT International Application No. PCT/US2024/010086, pp. 1-9.

Plus One Robotics. Demo: Parcel Induction. YouTube. Oct. 5, 2022. Retrieved from the Internet on Apr. 18, 2024: https://www.youtube.com/watch?v =YkD6tLxjHow, Entire Video, pp. 1-2.

European Search Report (EESR) of European Application No. 24198455.8, dated Feb. 20, 2025.

ABB Automation GmbH, "ABB is helping picking & packing go digital as it celebrates 20 years of its PickMaster software", Sep. 8, 2020.

(56) References Cited

OTHER PUBLICATIONS

ABB Automation GmbH, "PickMaster—Data Sheets and Videos", 2007-2020.
Alex Owen-Hill, "How to Program a Robot Conveyor Without Going Crazy", Apr. 3, 2019.
Ankit Srivastava, "Sense-Plan-Act in Robotic Applications", Feb. 2019.
D. E. Brown, et al., "A System to Singulate and Align Squid for Packaging and Processing, Marine Fisheries Review", Jun. 1981.
DENSO Robotics, "DENSO Wave Incorporated Industrial Robots", Jun. 4, 2017.
Denso Wave, "付加軸 トラッキング Video", May 31, 2018.
Dexterity, Inc., "Dexterity, Inc. Introduces Intelligent Robots for Warehouse Automation that Pick, Move, Pack and Collaborate", Jul. 21, 2020.
Douglas M. Considine, "Standard Handbook of Industrial Automation", 1986.
Dr. S. Balakirsky and Dr. R. Madjhavan, "Next Generation Packaging, Kitting, and Palletizing: Can one Robot doit all? Flyer", Feb. 9, 2012.
FANUC Corporation, "Exploiting Robotic Flexibility: Successes, Challenges & Opportunities", Feb. 9, 2012.
Focke Co., "Focke M Casepack Traypack Bags & Bundles Video", Feb. 2012.
Innoreports, "Robots Shine at NIST: Highlights from VMAC and MMC Events", Jun. 1, 2010.
K.E. Farnell, "User Needs, Benefits, and Integration of Robotic Systems in a Space Station Laboratory", Jan. 1989.
Kuka AG, "Mixed Palletizing 2 Video", Feb. 2012.
Kuka AG, "Mixed Palletizing Video", Feb. 2012.
KUKA Systems Corp., "KUKA Flexible Robot Sorter", Feb. 6, 2012.
KUKA Systems Corp., "KUKA Vision-Guided Picking", Feb. 6, 2012.
L. Chapman, et al., "A Sense-Think-Act Architecture for Low-Cost Mobile Robotics", Nov. 2015.
Luis Perez, et al., "Digital Twin and Virtual Reality Based Methodology for Multi-Robot Manufacturing Cell Commissioning", Apr. 24, 2020.
M. Siegel, "The sense-think-act paradigm revisited", Jun. 6, 2003.
Michal Maly and Andrea Pufflerova, "Singulation and sorting of parcels can benefit from AI powered robots", Jul. 25, 2020.
NIST, "NIST Manufacturing Competition Challenges University Teams to Stack a Better Pallet", Jan. 26, 2010.
NIST, "Virtual Manufacturing Automation Competition—Logistics", 2012.
NIST/IEEE, "IEEE ICRA VMAC 2010 Competition Video", May 27, 2010.
Post-Is, "Parcel Singular (with auto gapping) - POSTIS Video", Jul. 14, 2016.
R. Mattone, et al., "Sorting of items on a moving conveyor belt. Part 2: performance evaluation and optimization of pick-and-place operations", Apr. 2000.
ROS-I Consortium, "Demonstration of the Fraunhofer IPA ROS-I Driver for Yaskawa Motoman Dual Arm Robots Video", Dec. 9, 2014.
S. Kazemi and Hamed Karrati, "Conveyor with Pick and Place Robot using PLC", Jan. 2, 2017.
S. Mqaqa, et al., "Vision Guidance System for Component Handling Robot", Aug. 1, 2019.
Sangseung Kang, et al.; "Robotic Vision System for Random Bin Picking with Dual-Arm Robots", Dec. 5, 2016.
Seiko Epson Corporation, "Epson Rc+ 6.0 User's Guide", Oct. 5, 2015.
Shengfan Wang, et al., "Vision Based Picking System for Automatic Express Package Dispatching", Apr. 9, 2019.
Shuai Han, eta al., "Toward Fast and Optimal Robotic Pick-and-Place on a Moving Conveyor", Dec. 18, 2019.
SRI Japan, "Shakey the Robot (literature and videos)", 1966 - 1972.
SRI Japan, "Shakey the Robot: The First Robot to Embody Artificial Intelligence Video", Feb. 23, 2017.
Stephen Balakirsky, "Advancing Manufacturing Research Through Competitions", Apr. 14, 2019.
Sven Stumm, et al., "A Novel Concept for Realistic Simulation of Industrial Pick and Place Applications", Jun. 3, 2014.
Taimour El-Cheikh, "Development of a Simulation Model for Controlled Spacing Induction from Multiple Conveyor Lines", Nov. 8, 2002.
Terry Brown, "PARCEL Choosing a Singulation Method", Jun. 2017.
Vision Guided and Intelligent Robotics Lab (ViGIR Lab) is affiliated with Department of Electrical Engineering and Computer Science (EECS) in University of Missouri at Columbia, "The 2010 ICRA Robot Challenge", 2010.
Visual Components, "Robotics and Material Flos Simulation with Visual Components Video", May 29, 2009.
Xinbex, "Conveyor Belt with Robotic", Dec. 26, 2018.
Yaskawa Motoman Robotics, "Pick, Pack, Pallet: Can One Robot Do it All?", Feb. 6, 2012.

* cited by examiner

Control System 203

Vision System Interface 601

Object Detection Device Interface 603

Area/Conveyor Status Engine 605

Robot 1 Interface 607

Robot 2 Interface 609

In-Feed Conveyor Engine 611

Pick Conveyor 1 Engine 613

Pick Conveyor 2 Engine 615

Place Conveyor 1 Engine 617

Place Conveyor 2 Engine 619

Buffer Conveyor Engine 621

Induction Conveyor Engine 623

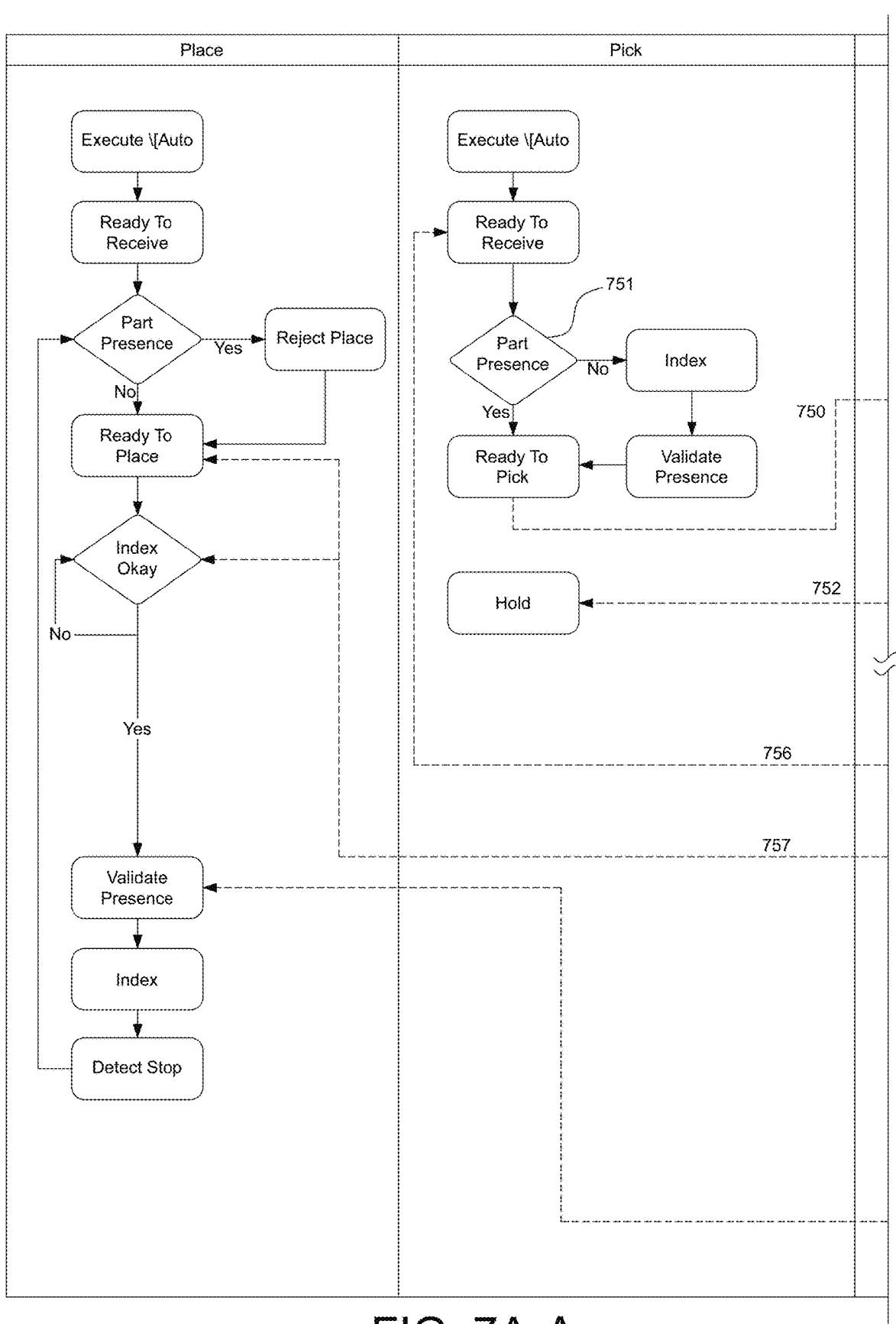
FIG. 7A-A

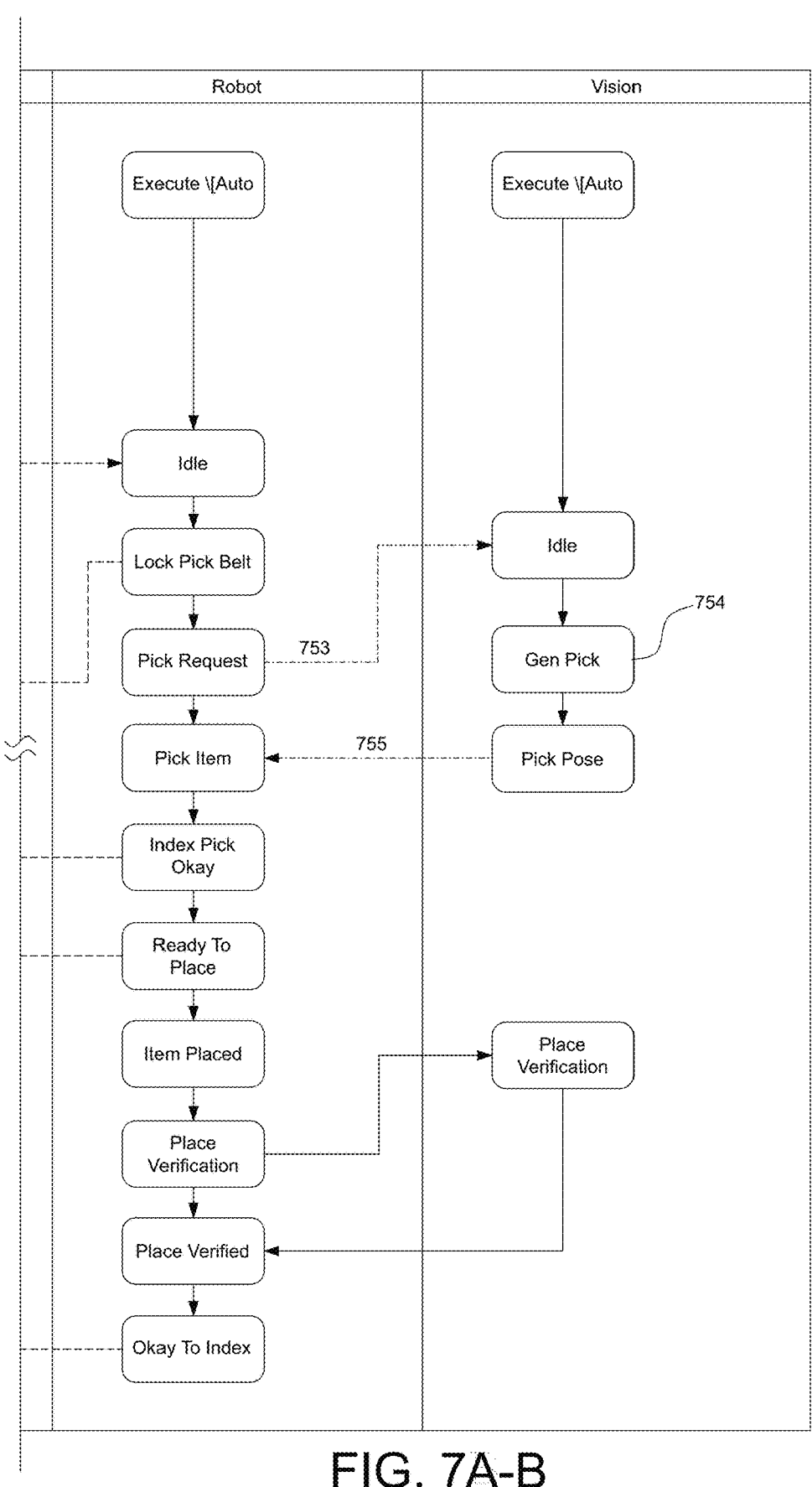
FIG. 7A-B

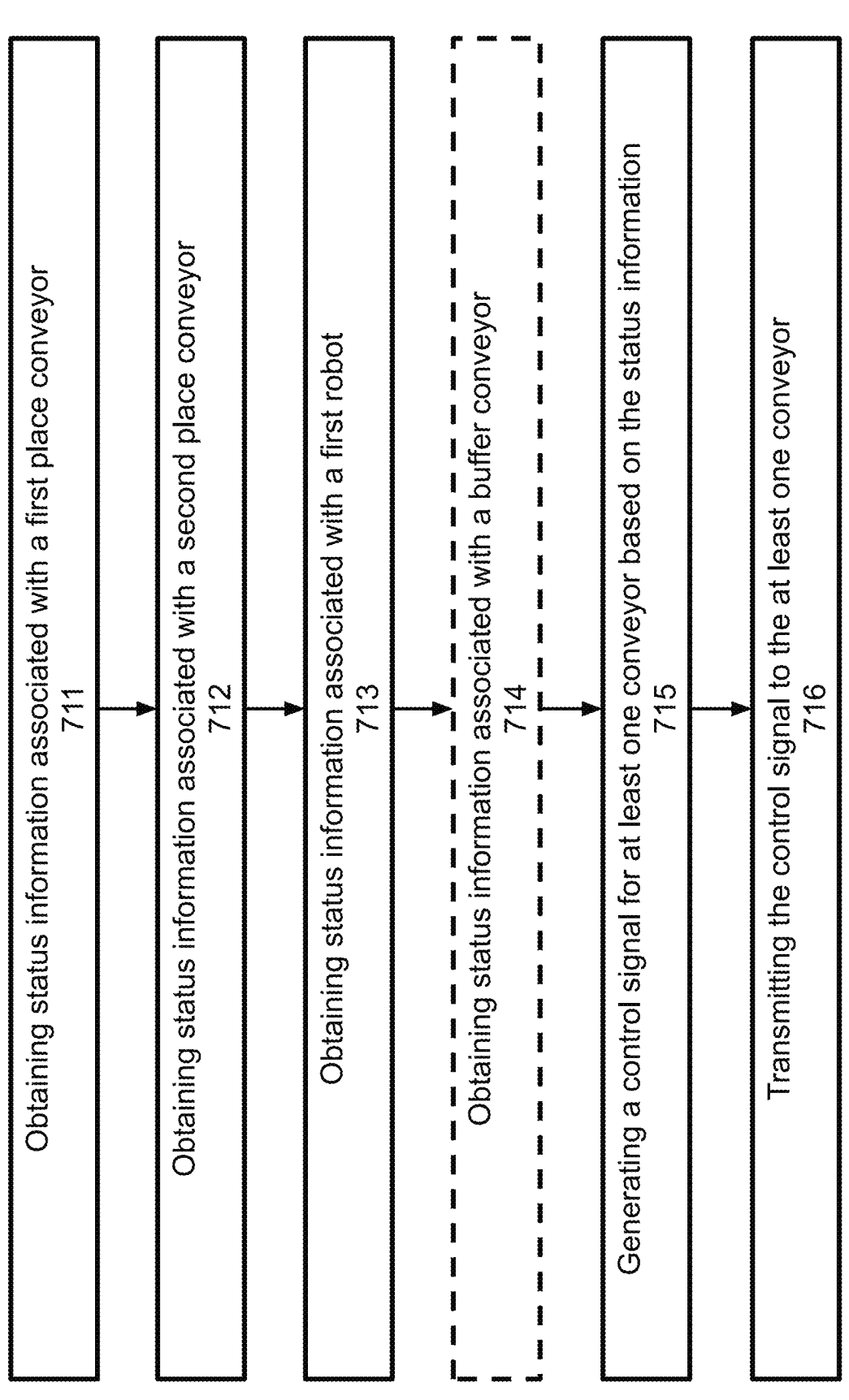

Obtaining status information associated with a first place conveyor 711

Obtaining status information associated with a second place conveyor 712

Obtaining status information associated with a first robot 713

Obtaining status information associated with a buffer conveyor 714

Generating a control signal for at least one conveyor based on the status information 715

Transmitting the control signal to the at least one conveyor 716

FIG. 7C

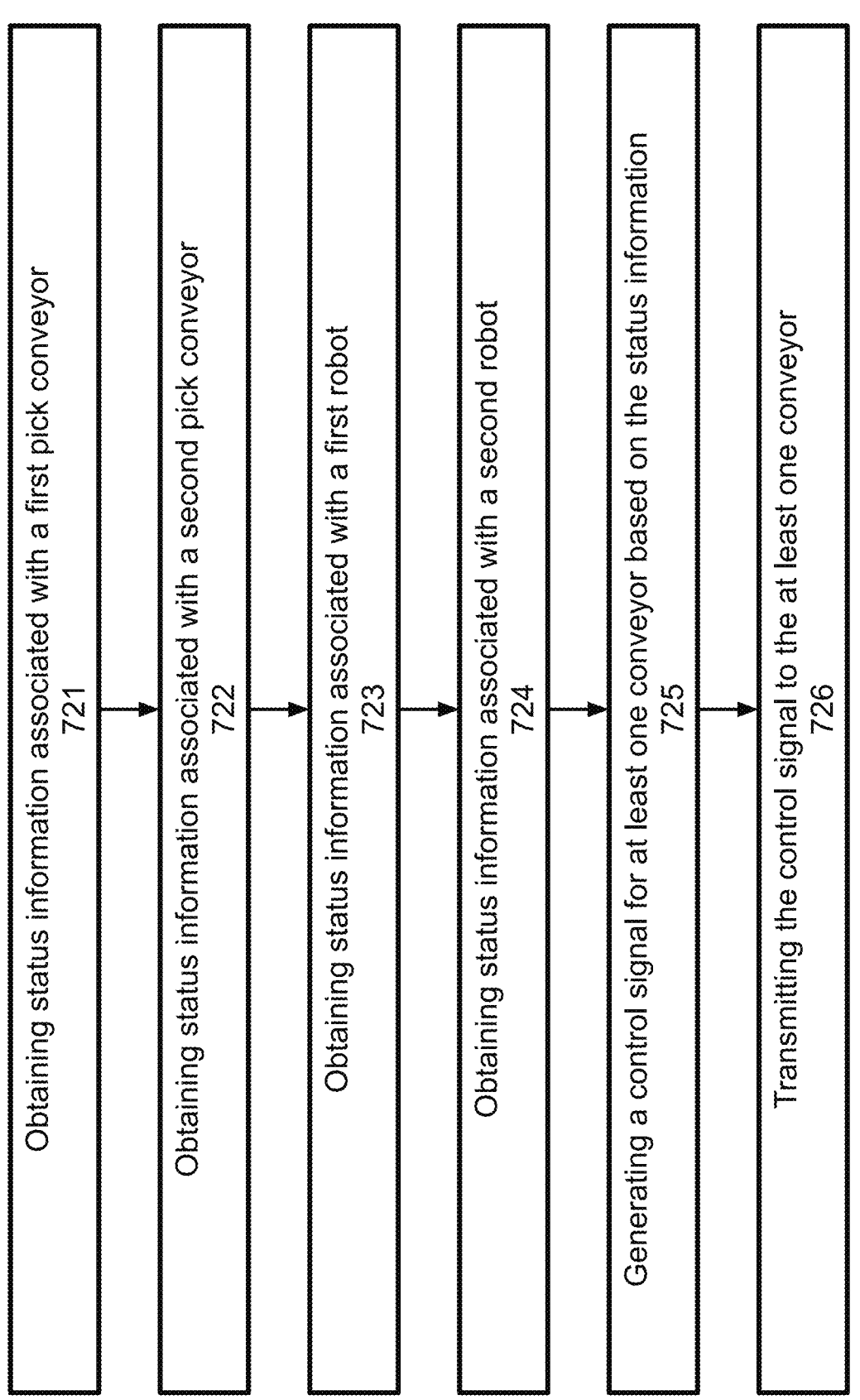

Obtaining status information associated with a first pick conveyor
721

Obtaining status information associated with a second pick conveyor
722

Obtaining status information associated with a first robot
723

Obtaining status information associated with a second robot
724

Generating a control signal for at least one conveyor based on the status information
725

Transmitting the control signal to the at least one conveyor
726

FIG. 7D

AUTOMATED MULTI-ARM ROBOTIC SYSTEM

CROSS-REFERENCE TO RELATED APPLICATIONS

This application claims priority to U.S. patent application Ser. No. 18/402,653, filed Jan. 2, 2024, entitled "AUTO-MATED MULTI-ARM ROBOTIC SYSTEM", which is hereby incorporated by reference. This application claims priority to U.S. Provisional Patent Application Ser. No. 63/436,361, filed Dec. 30, 2022, entitled "Automated Robotic Conveyance System," the entire contents of which are incorporated herein by reference. This application further claims priority to U.S. Provisional Patent Application Ser. No. 63/536,687, filed Sep. 5, 2023, entitled "Systems and Methods for Serial Dual Arm Robotic Induction," the entire contents of which are incorporated herein by reference.

BACKGROUND

Field of the Art

This disclosure relates to automated multi-arm robotic systems and methods for picking and/or placing parcels and efficiently dealing with exceptions.

Discussion of the State of the Art

Robotics picking systems sometimes make use of dual arm systems to speed up the induction work flow. These systems typically include two robotic arms positioned across from each other with a supply chute positioned between them. An example of a dual robotic arm system is shown in FIG. 1, where the system 100 includes two robotic arms 102, 104 with a supply chute 106 positioned between them. In other words, there is one robotic arm on either side of the chute 106. The chute 106 is a single manual lane that may be split down the middle. The two robotic arms 102, 104 are picking parcels from the single chute 106 and placing them onto a sorter, which should theoretically improve throughput relative to single arm systems.

Dual arm induction systems, however, have some significant and intractable limitations which make them unsuitable for many applications despite improved theoretical throughput. For example, dual arm induction systems tend to have very poor placement accuracy for a variety of reasons. For example, it is difficult to configure a verification system due to physical and cost related constraints. In practice, the robotic arms 102, 104 tend to miss the sorter and the system 100 is not configured to verify the quality of the placements. Another disadvantage of these current systems is the failure to manage exceptions. This limitation is also structural and inherently caused by the manner in which dual arm induction systems are laid out.

Currently, no available robotic picking systems offer the improved theoretical throughput of dual arm induction systems with improved accuracy including but not limited to improved singulation accuracy, and with an effective exceptions handling system.

SUMMARY

An automated robotic conveyance system in accordance with the present invention includes two or more pick area conveyor belts that operate in series with each other and an exceptions handling area at the end of the pick area so that exceptions do not have to be handled by the manipulators at all. The system further includes two or more manipulators that are configured to pick items from the pick area and place the items in the place area. Each one of the manipulators has an associated dedicated pick area and place area so that the manipulators are able to work independently of each other. The system is configured to identify exceptions and instruct the manipulators to avoid handling the exceptions. Still further, the system is configured to verify placement accuracy in the place area. A benefit of the serial flow layout disclosed herein is the ability to handle larger items in a given amount of footprint. With the prior art parallel flow systems having divided lanes, the lanes/pick zones are smaller by necessity, which limits the size of the largest parcels that can be handled by prior art systems.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

Figure 7B:
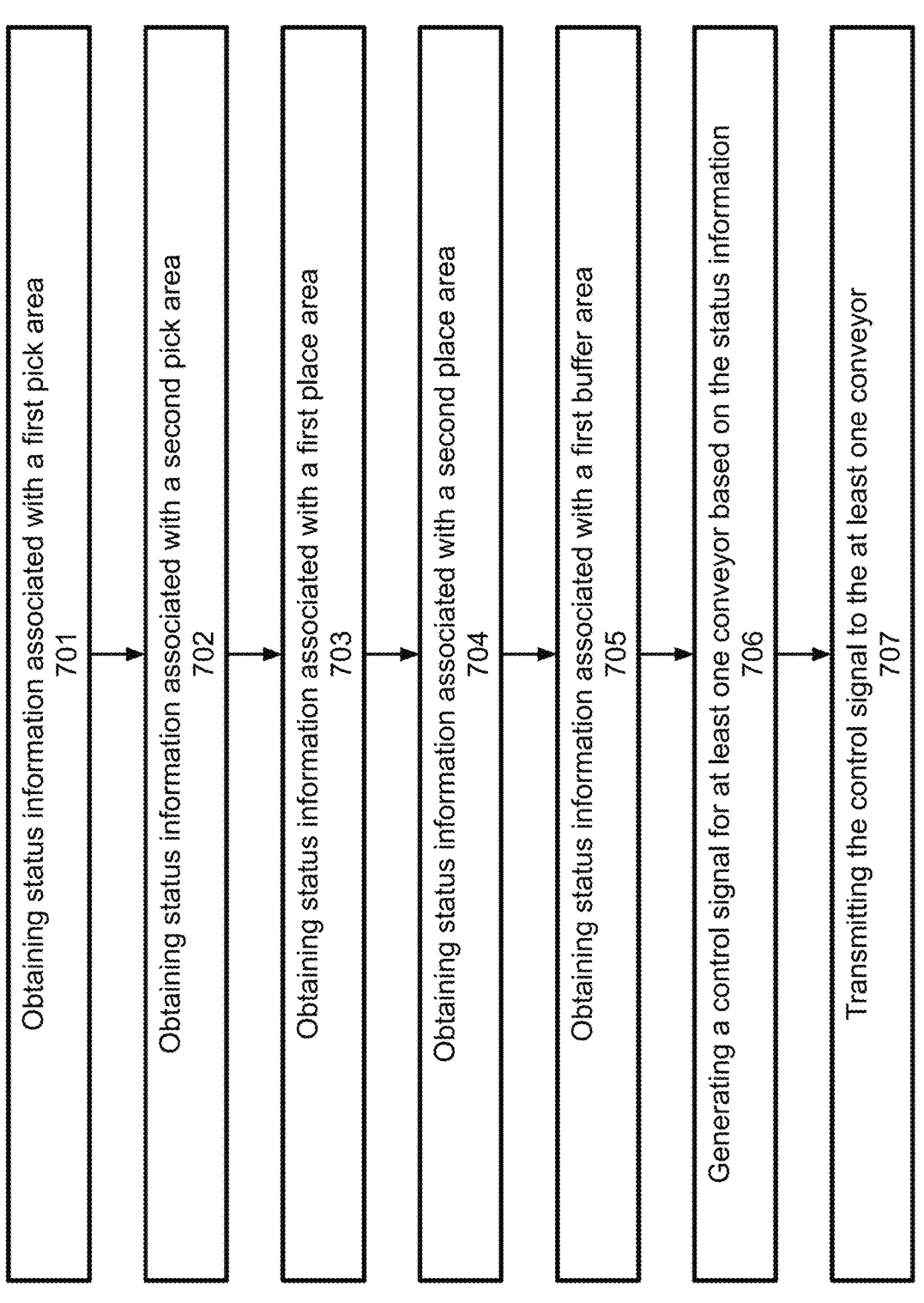

FIGS. 7A-A and 7A-B illustrate an exemplary process for controlling components of a serial dual arm robotic induction system according to one embodiment of the invention according to an embodiment of the invention.

FIG. 7B illustrates an exemplary process for controlling components of a serial dual arm robotic induction system according to one embodiment of the invention according to an embodiment of the invention.

FIG. 7C illustrates an exemplary process for controlling components of a serial dual arm robotic induction system according to one embodiment of the invention according to an embodiment of the invention.

FIG. 7D illustrates an exemplary process for controlling components of a serial dual arm robotic induction system according to one embodiment of the invention according to an embodiment of the invention.

Figure 8:
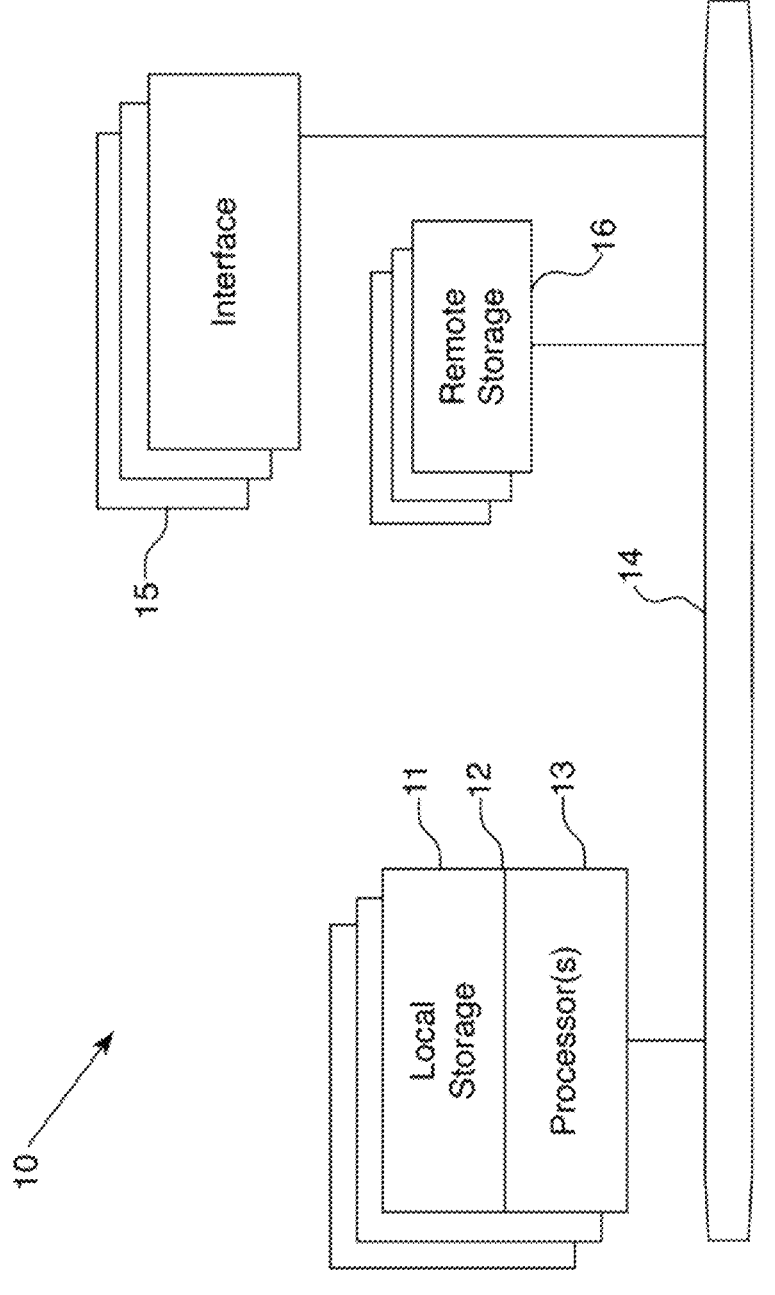

FIG. 8 illustrates one embodiment of the computing architecture that supports an embodiment of the inventive disclosure.

Figure 9:
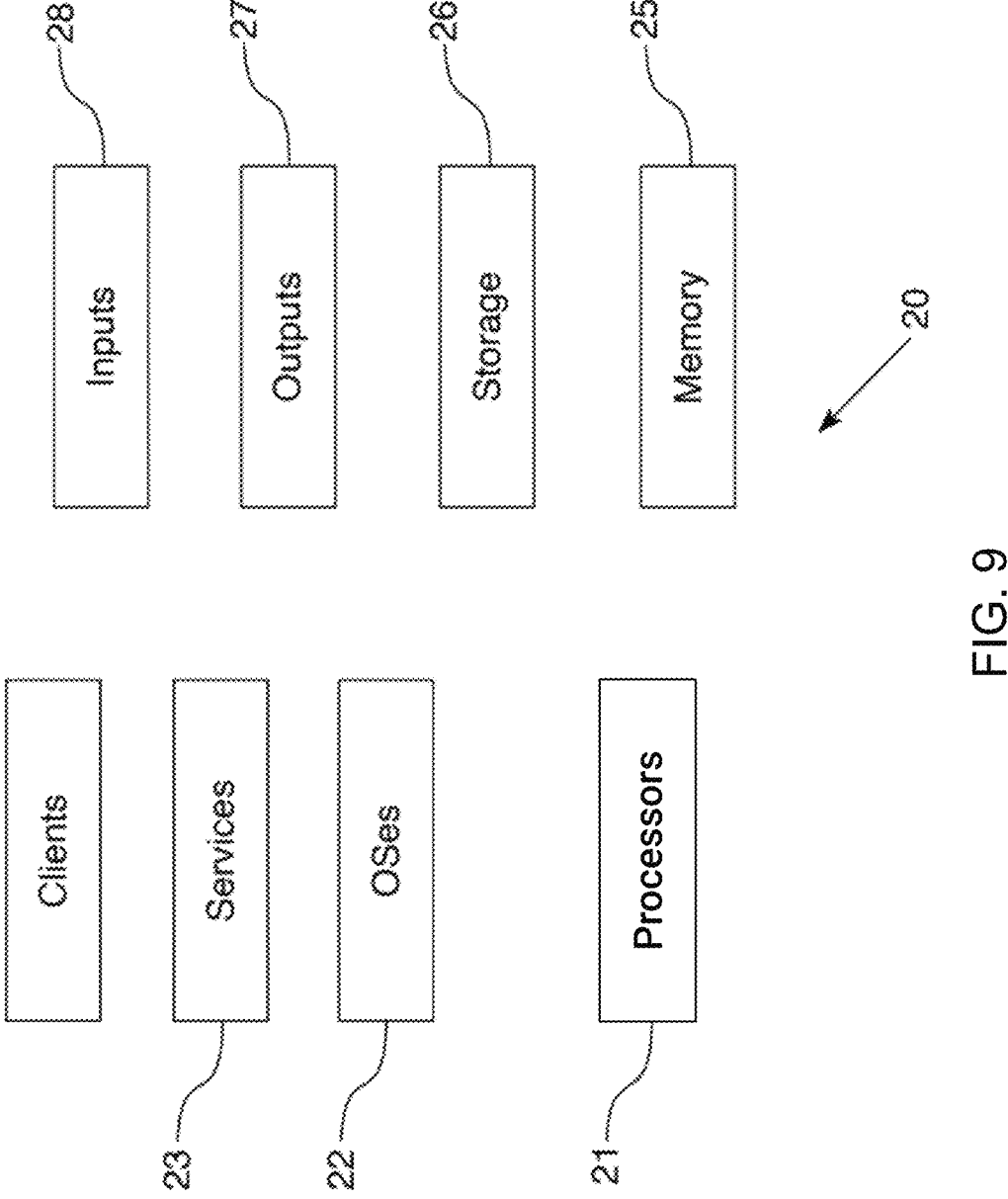

FIG. 9 illustrates components of a system architecture that supports an embodiment of the inventive disclosure.

Figure 10:
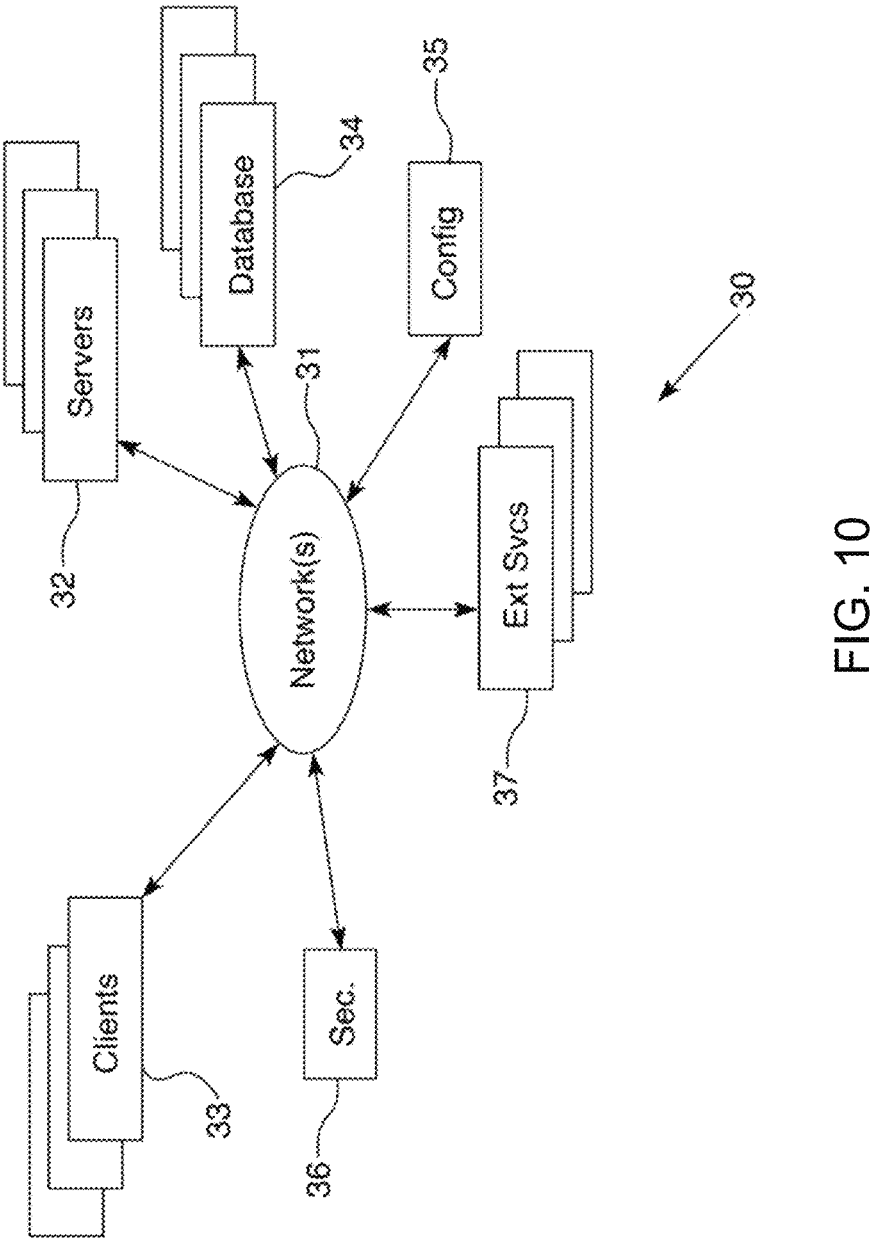

FIG. 10 illustrates components of a computing device that supports an embodiment of the inventive disclosure.

Figure 11:
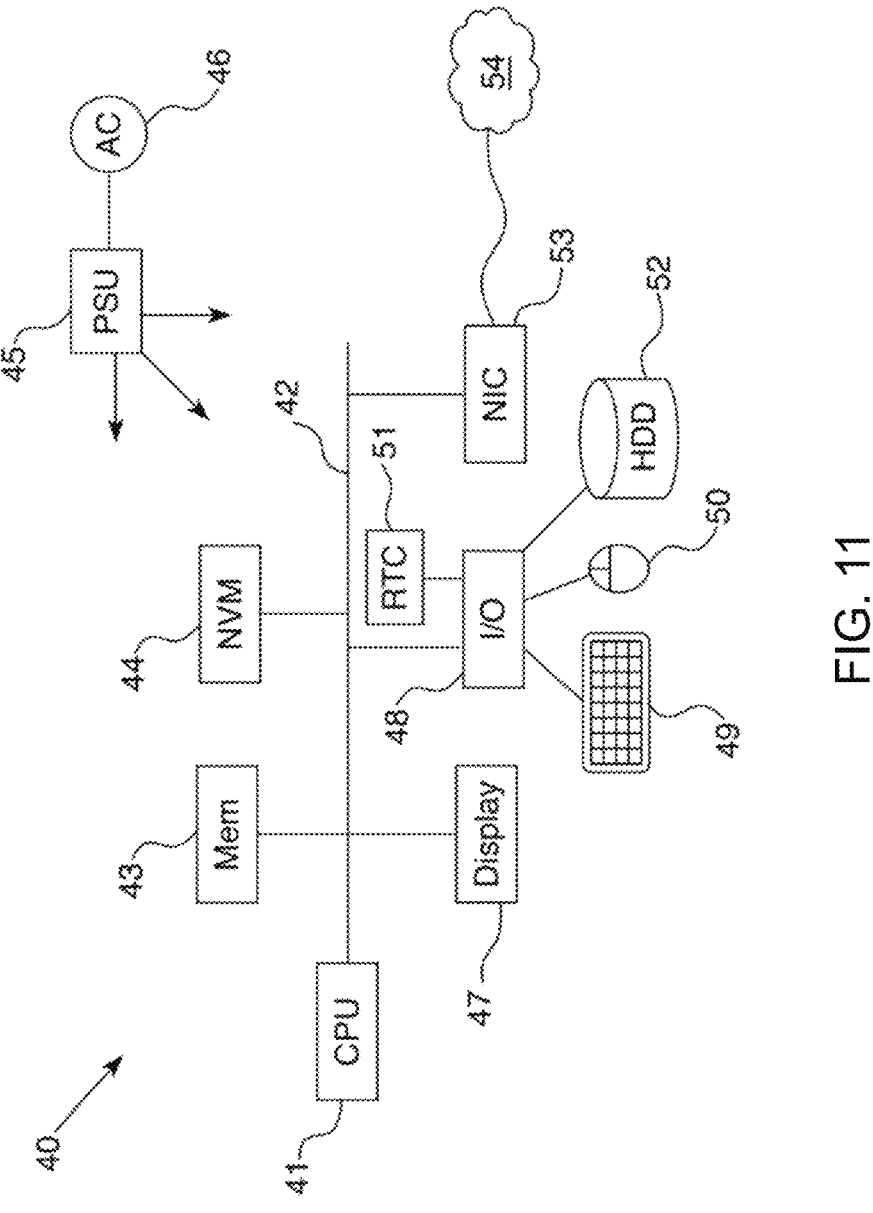

FIG. 11 illustrates components of a computing device that supports an embodiment of the inventive disclosure.

DETAILED DESCRIPTION

An automated robotic conveyance system in accordance with the present invention includes a plurality of pick area conveyor belts that operate in series with each other and an exceptions handling area at the end of the pick area so that exceptions do not have to be handled by the manipulators at all. The system further includes two or more manipulators that are configured to pick items from the pick area and place the items in the place area. The system is configured to identify exceptions and instruct the manipulators to avoid handling the exceptions. Still further, the system is configured to verify placement accuracy in the place area.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The system of the present invention is an automated robotic conveyance system that includes serialized conveyor belts in the pick and place areas and an exceptions handling area at the end of the pick area conveyor belts and adjacent to the place area conveyor belts. The system is configured for verifying placement of items in the place area in order to minimize damage to, and downtime of, the sorter.

Conceptual Architecture

Figure 1:
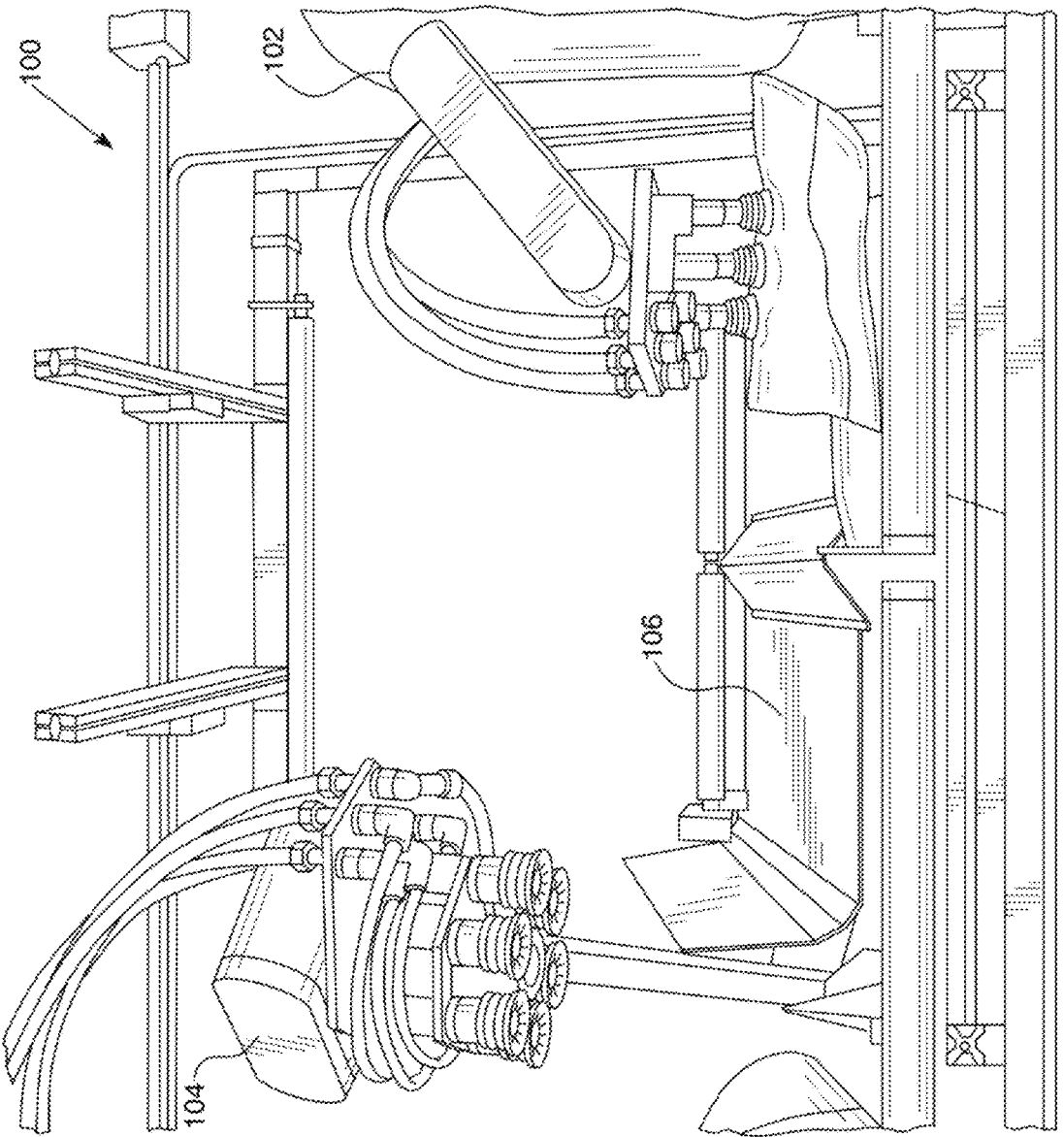
FIG. 1 illustrates a conventional system for dual arm induction.
Figure 2:
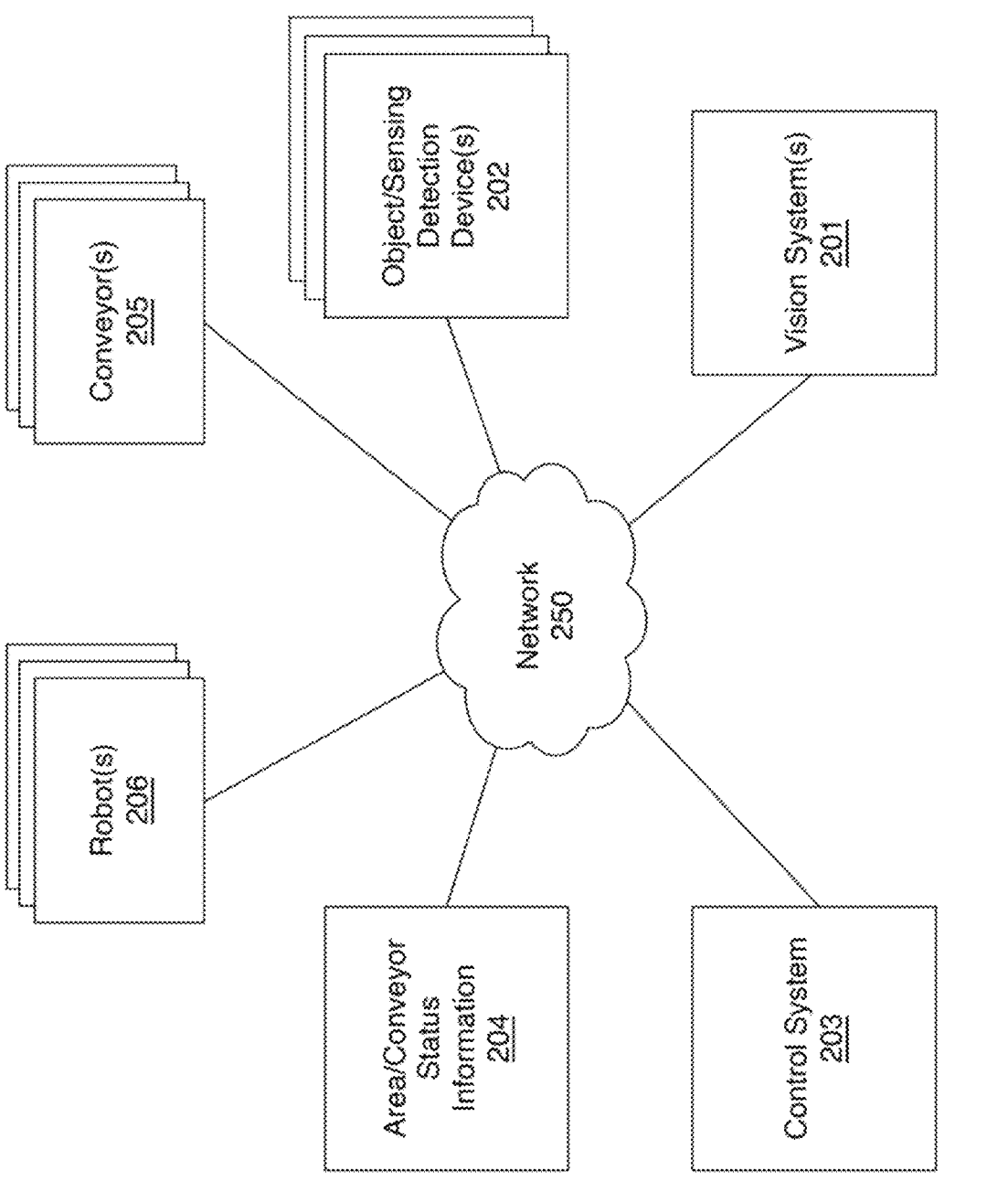
FIG. 2 illustrates a system for serial dual arm robotic induction in accordance with an exemplary embodiment of the invention.

FIG. 2 illustrates an exemplary embodiment of a serial dual arm robotic induction system according to one embodiment. The system includes vision system 201, object sensing/detection device 202, robots 206, conveyors 205, conveyor status information 204, control system 203, and a network 250 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

As a general overview, robot(s) 206 operate to pick objects from one conveyor 205 and move the objects to another conveyor 205. Control system 203 coordinates the movement of conveyors 205 to move objects through the system towards a downstream induction destination. The control system 203 may use at least one of area/conveyor status information 204, input from vision system(s) 201, and input from object sensing/detection device(s) 202 in determining appropriate controls for conveyors 205.

Robot(s) 206 may generally comprise a robot or robotic system capable of moving objects from one location to another. Robot(s) 206 may comprise robotic arms. Robot(s) 206 may be positioned relative to conveyors 205 such that objects can be moved from one conveyor to another.

Conveyor(s) 205 may generally comprise any conveying system capable of moving objects. Conveyor(s) 205 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. Conveyor(s) 205 may comprise variable speed control and/or direction control (e.g. forward/reverse control).

Vision system(s) 201 are generally operable to process data of an area to identify objects within the area. Vision system(s) 201 may process image and/or depth data of the area. Vision system(s) 201 may identify objects as being pickable objects (i.e. something the robot 206 can/should pick and move) and/or rejection/exception objects (i.e. something the robot 206 cannot/should not pick and move or something the vision system 201 is unsure about). Vision system 201 may include a plurality of camera for obtaining images at various locations throughout the conveyance system.

Object sensing/detection device(s) 202 are generally operable to detect the presence of objects and when an objects move from one location to another. For example, light beam or light array based devices may be positioned such that an object passing by the device is detected thereby providing the system with information about the location of objects and when objects are passing through certain locations such as from one conveyor 205 to the next.

Conveyor status information 204 generally comprises status information for at least one component of the automated induction system. Conveyor status information 204 may comprise status information for at least one of each conveyor in the automated induction system and each robot in the automated induction system. Conveyor status information 204 may comprise indexing information (e.g. index values) indicating the status of the one or more system components.

Control system 203 is generally operable to determine control instructions and/or generate control signals for one or more components of the automated induction system. Control system 203 may obtain status information 204 and analyze the status information 204 to determine suitable controls for efficiently moving objects within the automated induction system. Control system 203 may obtain information from the different system components (e.g. vision system 201, conveyor 205, robot 206, etc.) and determine corresponding status information based on the obtained system component information. The determined status information may be stored, updated and/or accessed as needed in order to determine appropriate control and timing of control for one or more conveyors 205.

Control system 203 may be embodied as one or more user device(s) which may include, generally, a computer or computing device including functionality for communicating (e.g., remotely) over a network 250. Data may be collected from user devices, and data requests may be initiated from each user device. User device(s) may be a server, a desktop computer, a laptop computer, personal digital assistant (PDA), an in- or out-of-car navigation system, a smart phone or other cellular or mobile phone, or mobile gaming device, among other suitable computing devices. User devices may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 250.

In particular embodiments, each user device may be an electronic device including hardware, software, or embedded logic components or a combination of two or more such components and capable of carrying out the appropriate functions implemented or supported by the user device. For example and without limitation, a user device may be a desktop computer system, a notebook computer system, a netbook computer system, a handheld electronic device, or a mobile telephone. The present disclosure contemplates any user device. A user device may enable a network user at the user device to access network 250. A user device may enable its user to communicate with other users at other user devices.

The user device may also include an application that is loaded onto the user device. The application obtains data from the network 250 and displays it to the user within the application interface.

Network cloud 250 generally represents a network or collection of networks (such as the Internet or a corporate intranet, or a combination of both) over which the various components illustrated in FIG. 2 (including other components that may be necessary to execute the system described herein, as would be readily understood to a person of ordinary skill in the art) may communicate with each other. In particular embodiments, network 250 is an intranet, an extranet, a virtual private network (VPN), a local area network (LAN), a wireless LAN (WLAN), a wide area network (WAN), a metropolitan area network (MAN), a portion of the Internet, or another network 250 or a combination of two or more such networks 250. One or more links connect the systems and databases described herein to the network 250. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 250, and any suitable link for connecting the various systems and databases described herein.

The system may also contain other subsystems and databases, which are not illustrated in FIG. 2, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Apparatus

The present invention is directed to a system having two or more robotic arms configured for taking on or inducting from a single in-feed conveyor. The system is better, faster, cheaper and simpler than previous systems and takes up less space than previous systems. The smaller footprint of the present invention allows for more space for manual induction and/or reverting to manual induction.

The present system is configured for high speed replenishment of the pick area and passive exceptions handling. Generally, in accordance with an embodiment of the invention, the pick conveyors stop moving while the robots are picking from a pick area. The robots then pick good or available products from the stationary conveyor. The exceptions are indexed out of the pick area while concurrently replenishing new product into the pick area. The exceptions area is located at the end of the pick area. Exceptions don't have to be touched by the robotic arm(s). In one example, the system (e.g., using artificial intelligence) determines that the package/parcel should not be handled by the robot. While the exceptions are being disposed of without robot intervention, new parcels/parcels are being fed into the system at the same time.

An "exception" is a package or parcel that is difficult or impossible for the robotic arms to pick up. Additionally, exceptions can also be items that can be handled by the robot but not the sorter. Examples include oversized, undersized, cylindrical, high aspect ratio, etc. Exceptions typically require human intervention. Previous systems typically require the system to shut down to allow for human intervention. A benefit of the present invention, as would be clear based on the provided descriptions, is that the system passively addresses foreign objects—i.e. spilled parcels, zip ties, trash, etc. that would lead to a jam or accumulation in the pick area if there is no path to clear them.

Figure 3:
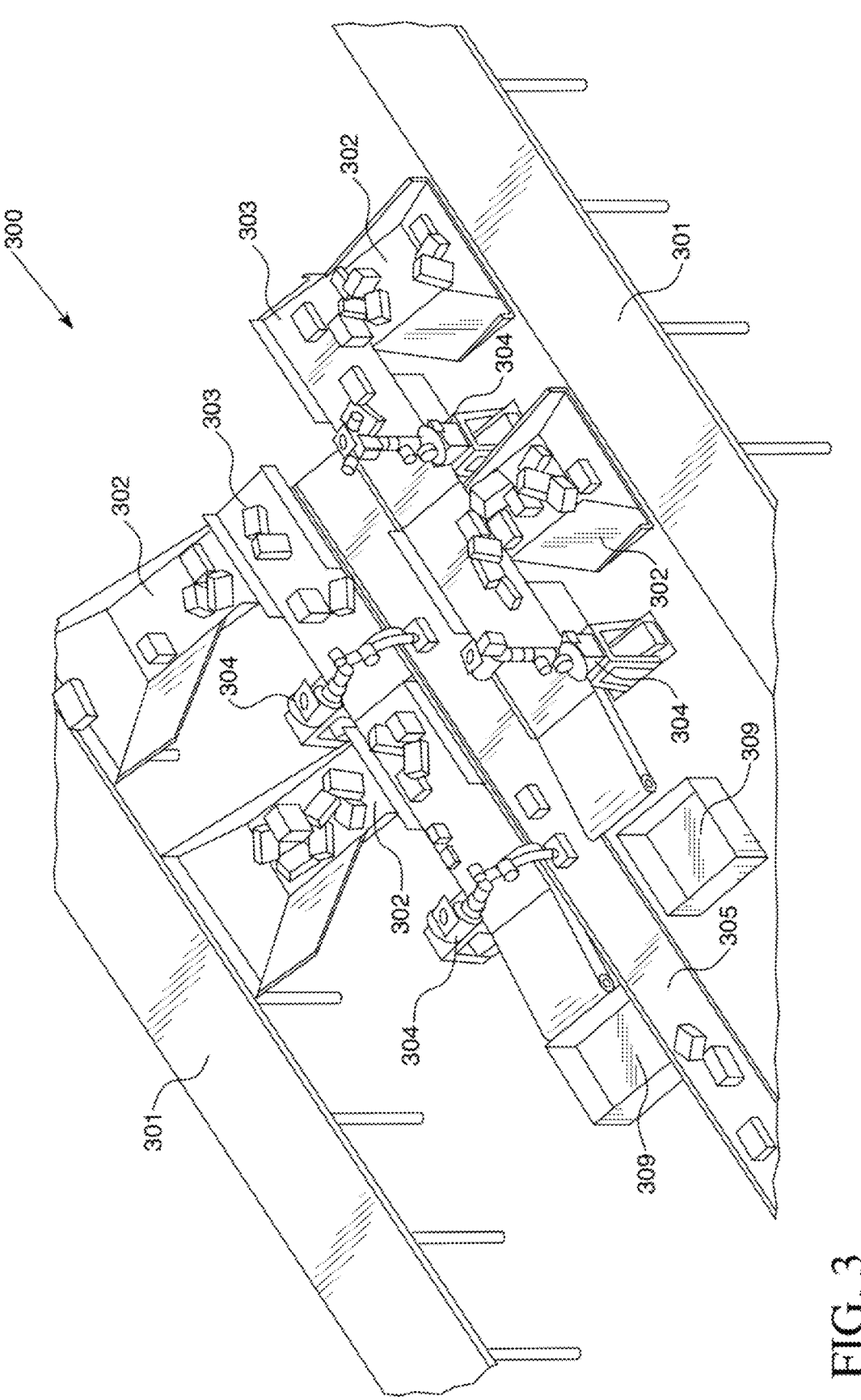
FIG. 3 illustrates an automated robotic conveyance system having a plurality of robotic arms and a plurality of supply chutes, in accordance with one embodiment of the present invention.

FIG. 3 depicts an automated robotic conveyance system 300 that includes bulk areas 301, buffer areas 302, pick areas 303, robotic arms 304, a place area 305, and exceptions areas 309. The bulk area 301 is where the bulk product supply comes from. Diverter paddles in the bulk area 301 divert the parcels into the buffer areas 302. The buffer areas 302 may include a conveyor and may have a large vertical capacity that can receive a large volume of product and meter it out into the pick areas 303. The buffer areas 302 are advantageous for supporting high throughputs of product through, for example, storing and metering out product from an intermittent and unpredictable supply. As such, the buffer areas 302 are configured for holding a high density supply of product. There is a velocity differential between the buffer conveyor and the pick area conveyor so that the high density supply of product in the buffer area 302 can be turned into a low density supply in the pick area 303. The reduced density of parcels in the pick area 303 is conducive to robotic handling of the parcels.

The system 300 includes two pick areas 303, where one pick area 303 is positioned along each side of the place area 305. Each one of the pick areas 303 includes a series of conveyor belts that are programmed to turn off and on, depending on how much product is present on the conveyor belt. Product flows from one conveyor belt to the next conveyor belt in the series until it is either picked up by the robotic arms 304 and moved to the place area 305, or it reaches the end of the pick area 303 and flows into the exceptions area 309. Product that gets deposited into the exceptions area 309 is easily accessible for human intervention.

Each one of the robotic arms 304 is associated with one buffer area 302. In other examples, two or more robotic arms are used to unload one buffer area. Further, the invention is not limited to single arm robots such as those depicted in

8

FIG. 3. Other manipulators may be used to pick and place the parcels. For example, the manipulator may be a human, a single robot having two arms, or the like. Any kind of manipulator may be used, so long as it is able to move product from the pick area 303 to the place area 305.

Although the robotic arms 304 are depicted as being mounted to, or resting on, the floor, it will be readily appreciated by one of ordinary skill in the art that the robotic arms 304 may alternatively be mounted to a wall, ceiling, overhead frame, or the like. In one exemplary embodiment, the robotic arms 304 are attached to a frame and positioned above the conveyors. The system 300 is not limited to the robotic arms 304 standing on the ground alongside the conveyors.

Product or parcels that are exceptions are identified by the vision system of the automated system 300. The robotic arms 304 are instructed to avoid items that are identified as exceptions. As such, the items identified as exceptions simply remain on the conveyor belts in the pick area 303 until the end of the conveyor belt series, at which point the exceptions are deposited into the exceptions area 309.

The system 300 may further include sensors operatively coupled to one or more of the conveyors. The sensors are configured for detecting whether a part is present. Such sensors may be operatively coupled to the pick conveyors and/or the place conveyors and signals from the sensors may be processed to determine whether a part is present and/or to confirm placement. The sensors may be line sensors, multi beam sensors, or the like, or a combination thereof.

Rather than being perpendicular to the sorter and parallel to each other, the fully separated streams on the pick side are fed in series. This arrangement allows for a flow-through exceptions path with minimal impact on system throughput.

Figure 4:
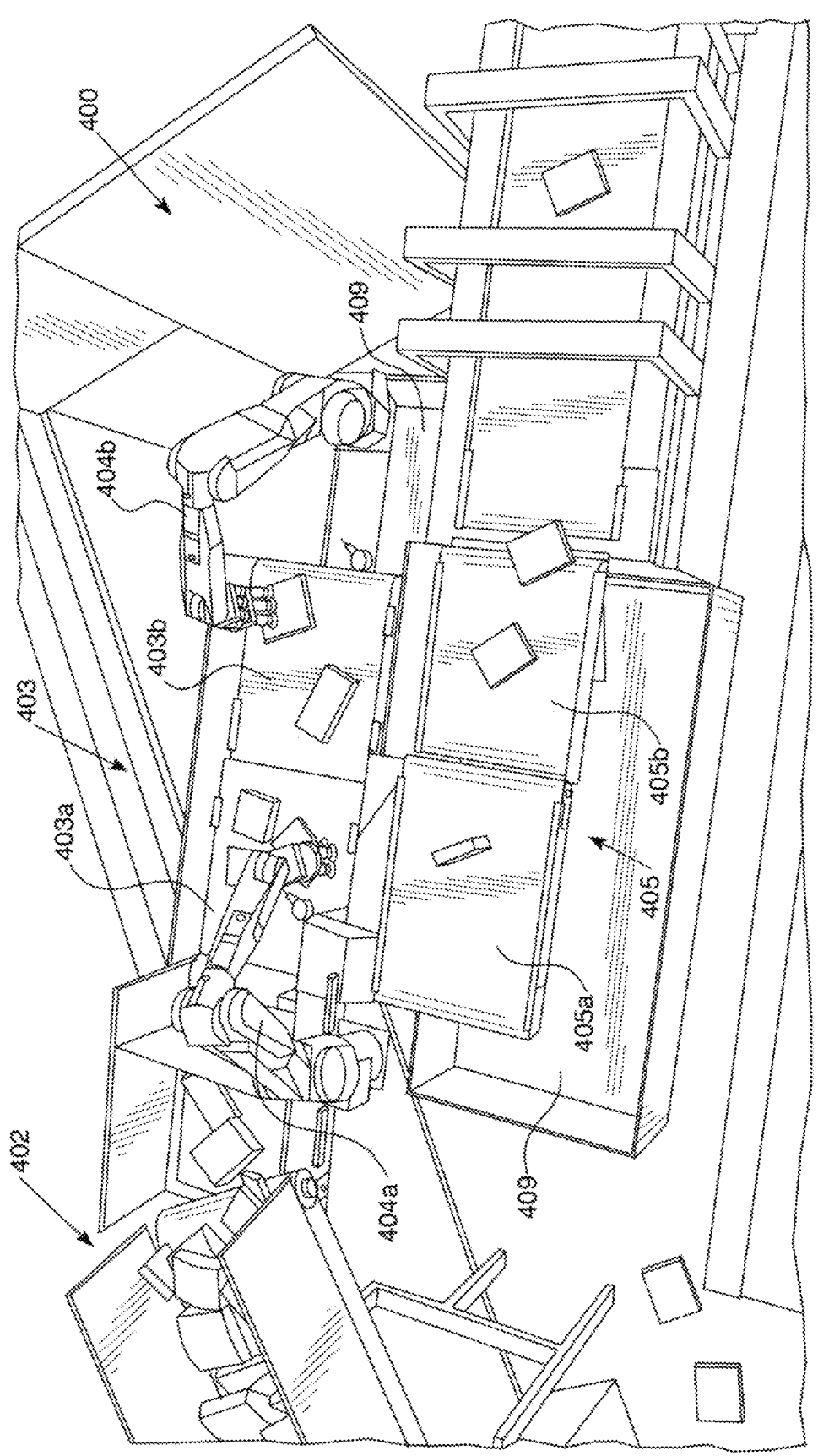
FIG. 4 illustrates an automated robotic conveyance system having two robotic arms and a single supply chute, in accordance with one embodiment of the present invention.

Another example of an automated robotic conveyance system 400 is shown in FIG. 4. The system 400 includes a bulk area (not shown), a buffer area 402, a pick area 403, robotic arms 404, a place area 405, and exceptions areas 409. The buffer area 402 includes a conveyor and may have a large vertical capacity that can receive a large volume of product and meter it out into the pick area 403. The buffer area 402 is advantageous for supporting high throughputs of product. As such, the buffer area 402 is configured for holding a high density supply of product. There is a velocity differential between the buffer conveyor and the pick area conveyor so that the high density supply of product in the buffer area 402 can be turned into a low density supply in the pick area 403. The lower density of parcels in the pick area 403 is conducive to robotic handling of the parcels.

The pick area 403 is positioned alongside the place area 405. The pick area 403 includes two conveyor belts 403a, 403b that operate in series and are programmed to turn off and on, depending on whether product is present on the conveyor belt. Product flows from the first pick conveyor 403a to the next pick conveyor 403b in the series until it is either picked up by the robotic arms 404 and moved to the place area 405, or it reaches the end of the pick area 403 and flows into the exceptions area 409. Product that gets deposited into the exceptions area 409 is routed outside of the robotic workcell. In one, non-limiting example, the exceptions area 409 may include a chute that leads below a mezzanine for potential human intervention.

In this example, two robotic arms 404 are simultaneously working on a single buffer area 402. It should be noted that the invention is not limited to single arm robots. Rather, the manipulators may be dual arm robots, humans, or the like.

One advantage of the arrangement shown in FIG. 4 is that the manipulators 404 may work together to manipulate very large or very heavy objects.

Although the robotic arms 404 are depicted as being mounted to, or resting on, the floor, it will be readily appreciated by one of ordinary skill in the art that the robotic arms 404 may alternatively be mounted to a wall, ceiling, overhead frame, or the like. In one exemplary embodiment, the robotic arms 404 are attached to a frame and positioned above the conveyors. The system 400 is not limited to the robotic arms 404 standing on the ground alongside the conveyors.

As the first robotic arm 404a is removing parcels from the first pick area conveyor belt 403a, the first pick area conveyor belt 403a is quickly replenished from the buffer area 402. As the second robotic arm 404b is removing parcels from the second pick area conveyor belt 403b and the second conveyor belt 403b becomes empty, both conveyor belts 403a, 403b turn on and are replenished while the first robot 404a is moving product to the place area 405. This methodology allows for extremely fast replenishment of both pick area conveyor belts 403a, 403b.

The place area conveyor belts 405a, 405b being alongside the pick area conveyor belts 403a, 403b, respectively, allows for the place area conveyor belts 405a, 405b to be independently turned off while product is placed thereupon and an image of the product on the place area conveyor belt 405a, 405b is obtained. The placement of the product on the place area conveyor belt 405a, 405b is verified before the conveyor belts 405a, 405b are turned on.

Placement verification is accomplished by taking an image of each item and using the image to confirm that the item is singulated, properly oriented, and properly sized before the item goes to the sorter (at the end of the place area conveyor belts 405). Because placement verification takes place during the pick and place process, rather than separately, the system 400 is configured for high throughput with high quality. In one example, an image is taken of the item(s) as soon as it is placed in the place area 405. The image is processed to confirm placement accuracy. If the item is not properly placed (i.e. size oriented or singulated, etc.), the system 400 is configured to instruct the manipulators 404 to correct the placement of the item.

Placement verification is advantageous to ensure that items that are being pushed into the sorter are not going to cause rework and downtime later. Improper placement of a product causes a sorter to shut down in many cases. It also can cause physical damage to the sorter.

When the feed starts, the downstream robot 404b gets priority. Product is fed through the system until the last robot 404b in the chain receives product. Once the last robot 404b receives product, it starts working and then the next robot upstream 404a can receive product and start working.

The system 400 may further include sensors operatively coupled to one or more of the conveyors. The sensors are configured for detecting whether a part is present. Such sensors may be operatively coupled to the pick conveyors and/or the place conveyors and signals from the sensors may be processed to determine whether a part is present and/or to confirm placement. The sensors may be line sensors, multi beam sensors, or the like, or a combination thereof.

Alternatively or additionally, the system 400 may include a "low prime" sensor, which is the upstream sensor on the conveyor. A variety of sensors may be used herein, as would be apparent to a person of ordinary skill in the art without departing from the scope of the invention, including proximity sensors, imaging sensors, depth-sensors or 3D sensors, transducers, pieozo-electric sensors, etc. In another example, the system 400 may include a "parts present" sensor, which determines whether parts are available in the pick area. Both of those sensors must be satisfied on the downstream robot 404b before the conveyor belt is stopped for the upstream robot 404a. In other words, if the second robot 404b is satisfied (i.e., parts are present in the pick area 403b and there are objects/parts in the conveyor belt), then the conveyor belts 403a, 403b may be stopped to give the robotic arms 404a, 404b time to move the product from the pick side conveyor belts 403a, 403b to the place side conveyor belts 405a, 405b, respectively. The conveyor belts 403a, 403b do not stop until the second robotic arm 404b is satisfied. In examples where there are more than two robotic arms, the pick area conveyor belts do not stop until the downstream robotic arm is satisfied.

The downstream robotic arm gets priority since it is farthest away from the supply. In other words, satisfying the downstream robotic arm (i.e., giving it product to move) is the most important priority. The upstream robotic arm(s) are closest to the supply and can thus receive supply fairly quickly and almost instantly. Making sure that the downstream robotic arm stays busy ensures that the most product is moved in the shortest possible amount of time.

In one embodiment, the invention is comprised of multiple conveyor belts in series. This configuration enables the upstream robot and the downstream robot to work at their own pace, wherein the pace will primarily depend on the number of items/parts in the pick area. For example, if there are four items in the downstream robot's pick area, then the downstream conveyor belt may be stopped while the downstream robot works to place the four items while the upstream robot continues to work and/or receive items in the upstream pick area. In exemplary embodiments, high rates may be achieved with a decoupled supply feed.

The present conveyance system allows for dedicated streams for the two robotic arms in the same space, while also allowing for a flow-through exceptions path.

One advantage of the current system is that there is physical separation between the robotic arms, thus minimizing possible interaction or interference between the robotic arms and optimizing the motion of the robotic arms.

Another advantage of the current system is that the current system may take up less space than previous systems and does not block manual access. The current system may have a smaller footprint than previous systems.

Figure 5:
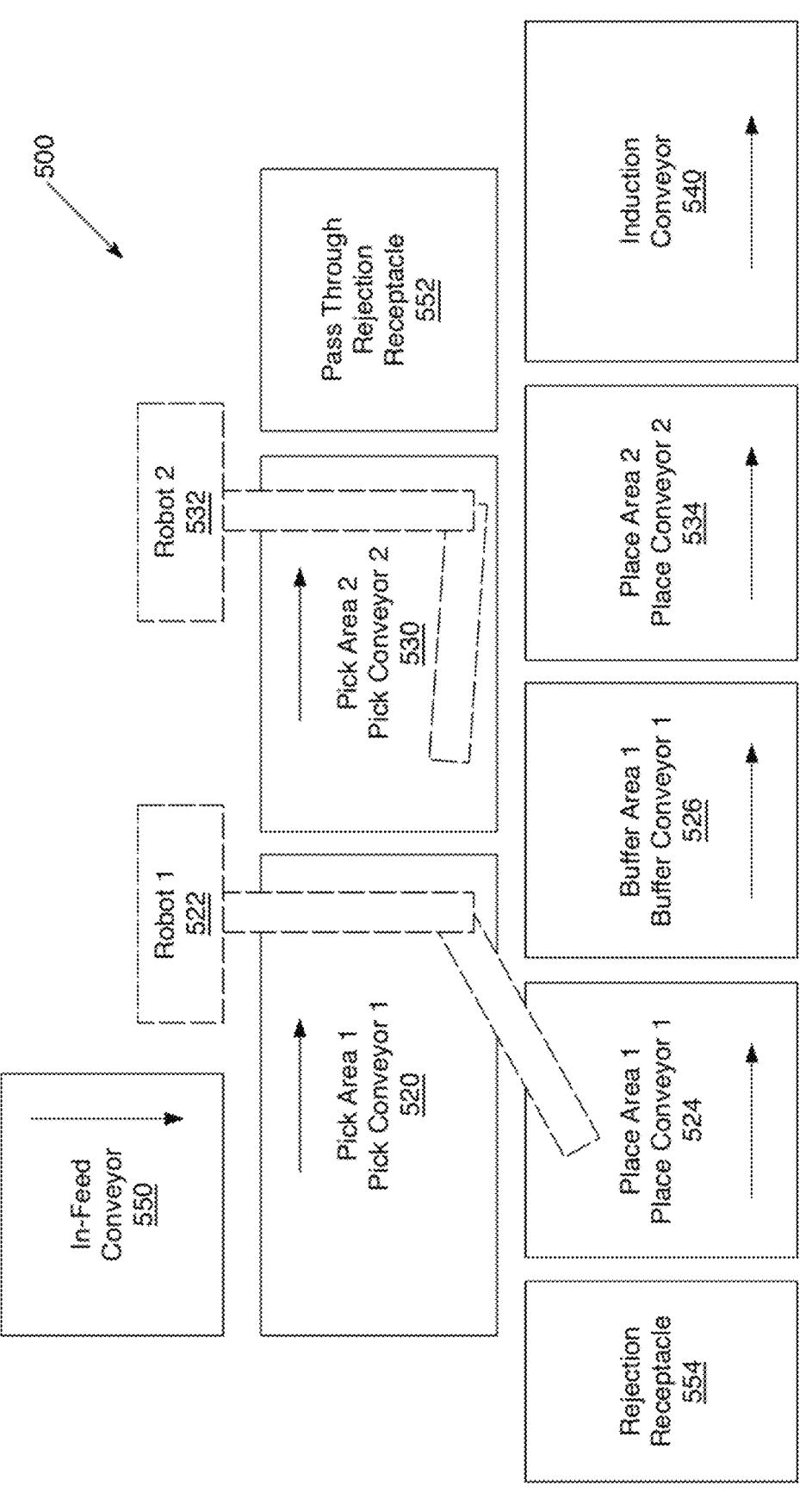
FIG. 5 illustrates a system for serial dual arm robotic induction in accordance with an exemplary embodiment of the invention.

FIG. 5 illustrates an exemplary embodiment of an automated serial dual arm robotic induction system 500 according to one embodiment. The system includes in-feed conveyor 550, a first pick conveyor 520, a second pick conveyor 530, a first robot 522, a second robot 532, a first place conveyor 524, buffer conveyor 526, a second place conveyor 534, induction conveyor 540, pass through rejection receptacle 552, and rejection receptacle 554. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks via alternate arrangements or configurations without departing from the scope of the invention.

In-feed conveyor 550 is operable to provide objects (e.g. parcels, boxes, etc.) for picking/sorting by the automated induction system. In-feed conveyor 550 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. The conveyor may comprise variable speed control and/or direction control (e.g. forward/reverse control).

The first pick conveyor 520 is operable to receive objects and move objects along a first pick area. The first pick conveyor 520 may receive objects from in-feed conveyor 550 and move objects towards the second pick conveyor 530. The first pick conveyor 520 is operable to move at a speed greater than in-feed conveyor 550 thereby serving to increase the spacing between objects as they move from in-feed conveyor 550 onto the first pick conveyor 520 thereby allowing for improved capabilities in identifying and picking of distinct objects by robots. The first pick conveyor 520 may move objects within a first pick area associated with the first robot 522. The first pick conveyor 520 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. The first pick conveyor 520 may comprise variable speed control and/or direction control (e.g. forward/reverse control). The first pick conveyor may be dedicated to a first robot such that the first robot has a dedicated pick area independent of a second robot/pick area thereby allowing the first robot to operate independently of the second robot (i.e. the robots are deconflicted).

The second pick conveyor 530 is operable to receive objects and move objects along a second pick area. The second pick conveyor 530 may receive objects from the first pick conveyor 520 and move objects towards the pass through rejection station (e.g. pass through rejection receptacle 552, conveyor or the like). The second pick conveyor 530 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. The second pick conveyor 530 may comprise variable speed control and/or direction control (e.g. forward/reverse control). The second pick conveyor may be dedicated to a second robot such that second robot has a dedicated pick area independent of a first robot/pick area thereby allowing the second robot to operate independently of the first robot (i.e. the robots are deconflicted).

The first robot 522 may comprise a robotic arm or other robotic system operable to move objects from a first location to a second location (e.g. from the first pick conveyor 520 to the first place conveyor 524). In one aspect, the first robot 522 may pick objects from a first pick area associated with the first pick conveyor 520 and move the objects to a first place area associated with the first place conveyor 524. The first robot 522 may operate based on instructions from at least one of a vision system (e.g. vision system 201) and a control system (e.g. control system 203).

The second robot 532 may comprise a robotic arm or other robotic system operable to move objects from a first location to a second location (e.g. from the second pick conveyor 530 to the second place conveyor 534). In one aspect, the second robot 532 may pick objects from a second pick area associated with the second pick conveyor 530 and move the objects to the second place area associated with the second place conveyor 534. The second robot 532 may operate based on instructions from at least one of a vision system (e.g. vision system 201) and a control system (e.g. control system 203). In one aspect, the second robot 532 may be considered as the prioritized robot in the overall system such that the second robot 532 consistently has an opportunity to continue picking objects from the second pick conveyor 530 rather than regularly having to wait for parcels to arrive within the second pick area in order to execute picking operations. This allows for a higher processing rate of objects through the overall system as more simultaneous picking can occur with both robots 522 and 532 operating simultaneously rather than one robot waiting for pickable objects to arrive or waiting for the other robot to complete an action as may occur if robot 522 is prioritized or in conventional parallel picking configurations.

The first place conveyor 524 is operable to receive objects and move objects along a first place area. The first place conveyor 524 may receive objects placed by the first robot 522, such as those picked and moved from the first pick conveyor 520. Upon successful placement of an object on the first place conveyor 524, the first place conveyor 524 may move the object to buffer conveyor 526 thereby freeing up space for another object to be placed on the first place conveyor 524. The first place conveyor 524 may receive objects from buffer conveyor 526, such as when an exception or rejection object has been identified on the place side of the system and such object needs to be moved to rejection receptacle 554. As such, the first place conveyor 524, and the buffer conveyor 526 may be at the same level. That is, the first place conveyor 524 and the buffer conveyor 526 may be collinear. The first place conveyor 524 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. The first place conveyor 524 may comprise variable speed control and/or direction control (e.g. forward/reverse control).

The buffer conveyor 526 is operable to receive objects and move objects along a buffer area. Buffer conveyor 526 may receive objects from the first place conveyor 524. Buffer conveyor 526 may hold objects for a suitable time prior to moving objects downstream to the second place conveyor 534. Buffer conveyor 526 serves to allow objects to moved from an adjacent conveyor thereby freeing up space for further object placements until a suitable time when conveyors can be activated to pass objects through to induction conveyor 540. Although only one buffer conveyor 526 is depicted, a plurality of buffer conveyors may be employed depending on various factors such as space limitations and optimal number of buffers necessary to minimize downtime of robot movements due to waiting for an open space to place a picked object. In one aspect, as opposed to a physically separate buffer conveyor, a larger (i.e. longer) conveyor may be used as the first place conveyor wherein the first place conveyor may be subdivided into logical zones thereby achieving the same or similar effects as having an independent buffer conveyor. Buffer conveyor 526 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. The buffer conveyor 526 may comprise variable speed control and/or direction control (e.g. forward/reverse control).

The second place conveyor 534 is operable to receive objects and move objects along a second place area. The second place conveyor 534 may receive objects placed by the second robot 532, such as those picked and moved from the second pick conveyor 530. Upon successful placement of an object on the second place conveyor 534, the second place conveyor 534 may move the object downstream to induction conveyor 540. The second place conveyor 534 may receive objects from buffer conveyor 526 and, when appropriate, continue moving objects along to induction conveyor 540. The second place conveyor 534 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. The second place conveyor 534 may comprise variable speed control and/or direction control (e.g. forward/reverse control). In one aspect, the second place conveyor 534 may be replaced with or otherwise combined with induction conveyor 540 such that objects placed by the second robot are placed directly onto an induction conveyor without the need for an intermediate second place conveyor 534. This may be accomplished in various ways as would be apparent to one of ordinary skill in the art such as, but not limited to, at least one of adjusting the size/length of the induction conveyor, adjusting the size/length of the other conveyors, and adjusting the relative locations of the other conveyors with respect to the induction conveyor.

Placement verification is accomplished by taking an image of each item and using the image to confirm that the item is singulated, properly oriented, and properly sized before the item goes to the sorter (at the end of the place area conveyor belts 524, 534). Because placement verification takes place during the pick and place process, rather than separately, the system 500 is configured for high throughput with high quality. In one example, an image is taken of the item(s) as soon as it is placed in the place area. The image is processed to confirm placement accuracy. If the item is not properly placed (i.e. size oriented or singulated, etc.), the system 500 is configured to instruct the manipulators 522, 532 to correct the placement of the item.

Placement verification is advantageous to ensure that items that are being pushed into the sorter are not going to cause rework and downtime later. Improper placement of a product causes a sorter to shut down in many cases. It also can cause physical damage to the sorter.

Induction conveyor 540 is operable to receive objects from the second place conveyor 534 and move objects downstream for object induction. Induction conveyor 540 may comprise a belt conveyor, roller conveyor, chain conveyor, screw conveyor, track or rail conveyor, slat conveyor, motorized conveyor, vertical conveyor, horizontal conveyor, incline or decline conveyor, and combinations thereof. The induction conveyor 540 may comprise variable speed control and/or direction control (e.g. forward/reverse control).

The first rejection receptacle 552 is operable to receive exception or rejection objects passing through the system on the pick side (i.e. the pick conveyors 520, 530). Exception or rejection objects may generally comprise objects which require further handling or intervention. Such objects may comprise, but are not limited to, at least one of damaged objects, objects which a vision system was uncertain how to handle, objects which a robot was unable to pick or handle with sufficient confidence, and objects which are deemed improper for induction. The first pass through rejection receptacle 552 may comprise a component(s) other than a receptacle such as an additional conveying system, chute, table, surface, or other component suitable for receiving objects.

The second rejection receptacle 554 is operable to receive exception or rejection objects passing through the system on the place side (i.e. the place conveyors 524, 534 and buffer conveyor 526). In one aspect, the second rejection receptacle 554 may receive objects rejected downstream (e.g. from induction conveyor 540 or elsewhere) wherein the rejected objects can be passed back upstream through the place and buffer conveyors 524, 534, 526 and ultimately arriving at rejection receptacle 554. As such, the place conveyors 524, 534 and the buffer conveyor 526 may be collinear (i.e., positioned at the same elevation as each other). Rejection receptacle 554 may comprise components other than a receptacle such as an additional conveying system, chute, table, surface, or other component suitable for receiving objects.

It is noted that the arrows in FIG. 5 are an exemplary embodiment indicative of what may be typical conveyor movement and object flow during standard induction (e.g. objects being successfully placed and passed on without being rejected or returned from the downstream induction conveyor). However, each conveyor may be operated independently or in combination to reverse the movement direction and direct objects in a manner other than that depicted by the arrows. Although not depicted, one or more conveyors may be associated with a vision system for detecting objects located within each corresponding area. Although not depicted, one or more conveyors may be associated with other object sensing/detection device(s) for detecting objects located within each corresponding area. For example, light beam or light array devices may be positioned such that an object passing by the device is detected thereby providing the system with information about the location of objects and when objects are passing through certain locations such as from one conveyor to the next.

This arrangement in FIG. 5 is merely exemplary and the components may be repositioned, rearranged and have their orientation modified without departing from the scope of the invention. For example, the in-feed conveyor 550 could be arranged in line with or at an angle reactive to the pick conveyors 520, 530. As another example, the in-feed conveyor 550 could be positioned on the right side of FIG. 5 where the pass through receptacle 552 is located and the pass through receptacle 522 moved to the left side of the first pick conveyor 520 without departing from the scope of the invention. Other modifications could be made as would be apparent to one of ordinary skill in the art without departing from the scope of the invention. As would be apparent to one of ordinary skill in the art, a change in the arrangement or orientation of components would be accompanied by a corresponding change in the control logic and decision making logic. Such would fall within the scope of the invention and would generally follow the same principle of moving objects downstream, i.e. from in-feed conveyor 550 towards the induction conveyor 540 which may comprise reversing or otherwise changing the conveyor directions to something other than that depicted in FIG. 5. Furthermore, regardless of the orientation or direction the conveyors are to move, such would still comprise evaluating the impact of controlling each component based on status information associated with other components which would be affected by such control, in particular those components adjacent to the component for which control is being evaluated.

The dedication of designated pick and place conveyors to either a first or second robot as described above allows for deconfliction of the robots so that each spends less time waiting for actions by the other robot as compared to conventional systems.

Control System

Figure 6:
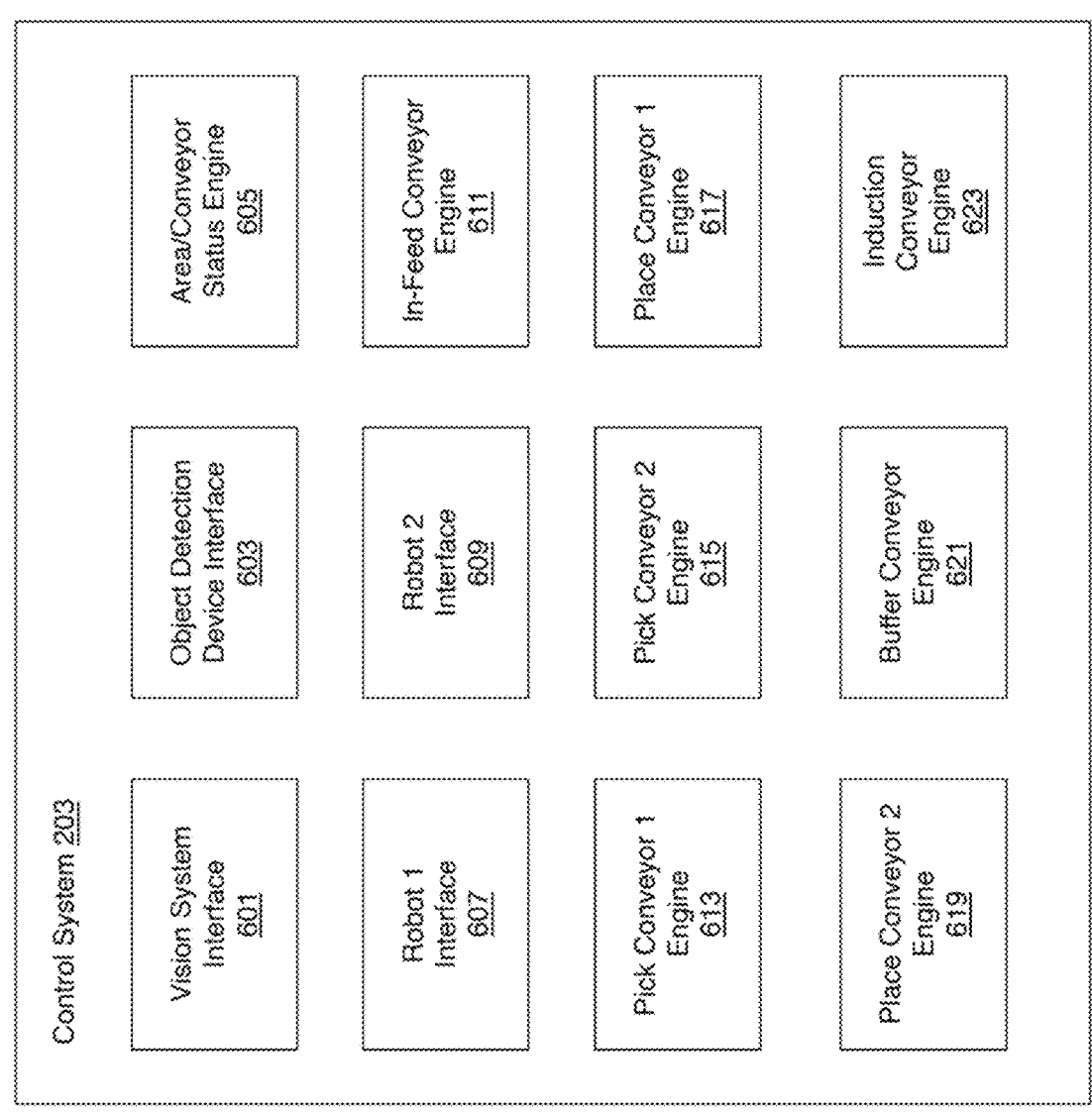
FIG. 6 illustrates a control system for use in serial dual arm robotic induction in accordance with an exemplary embodiment of the present invention.

FIG. 6 illustrates an exemplary embodiment of the control system 203. The control system 203 comprises vision system interface 601, object detection device interface 603, area/conveyor status engine 605, first robot interface 607, second robot interface 609, in-feed conveyor engine 611, first pick conveyor engine 613, second pick conveyor engine

615, first place conveyor engine 617, second place conveyor 619, buffer conveyor engine 621, and induction conveyor engine 623. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

The control system 203 may comprise at least one of, but not limited to, a programmable logic controller (PLC), a field programmable gate array (FPGA), microcontroller(s), embedded controller, single board computer, programmable logic relay (PLR), distributed control system (DCS), programmable automation controller (PAC), and the like. This list is not intended to be limiting and other control components could be used as would be apparent to one of ordinary skill in the art.

Vision system interface 601 is operable to communicate with at least one vision system. Vision system interface 601 may obtain information associated with identified objects for at least one area or conveyor associated with an automated induction system (e.g. automated induction system 300, 400, and/or 500). The obtained information may comprise information indicating at least one of a number of objects in each area, the location of the objects, whether objects are pickable, whether an object was successfully picked and whether an object was successfully placed.

Object detection device interface 603 is operable to communicate with at least one object detection/sensing device. Object detection device interface 603 may obtain information associated with identifying objects associated with at least one area or conveyor associated with an automated induction system. The obtained information may comprise information indicating at least one of the number of objects in a given area, number of objects passing from one area to another, etc.

First robot interface 607 is operable to communicate with a first robot (e.g. robot 404a or 522). Second robot interface 609 is operable to communicate with a second robot (e.g. robot 404b or 532). The robot interfaces 607, 609 are generally operable to obtain information about the status of each robot. Status information for a robot may comprise, but is not limited to, at least one of an indication of ready to pick an object, pick in progress, ready to place an object, place in progress, waiting for pick instructions, in motion, stationary. Such information may aid the below decision engines in determining appropriate actions and the timing of such actions. For example, while a pick is in progress, it may not be ideal to move the corresponding pick conveyor as this could disrupt the robot's ability to successfully pick the object. The same applies on the placement side.

Area/conveyor status engine 605 is operable to determine and/or manage status information associated with at least one area and/or conveyor of an automated induction system (e.g. automated induction system 300, 400, and/or 500).

Status engine 605 may determine status information based on input from at least one of vision system interface 601, object detection device interface 603, and robot interfaces 607, 609. For example, status information may comprise at least one of information regarding the presence of objects in a given area, whether a pick operation or place operation is currently underway in a given area, etc. Status engine 605 may employ an indexing approach to manage different statuses for each area/conveyor. For example, a first index value may indicate the presence of an object in an area, a second index value may indicate no object present in an area, a third index value may indicate a pick or place operation is in progress in an area, a fourth index value may indicate a conveyor is currently moving in an area, etc. These are merely exemplary and fewer index values may be used or additional index values may be used to indicate additional statuses as would be apparent to one of ordinary skill in the art. For example, a simplified version may comprise an index value to indicate a "ready" status and another index value to indicate a "not ready" status where the ready/not ready status may be based on the additional information such as whether objects are present and/or whether pick/place operations are in progress. Status engine 605 may maintain and regularly update status information for each of a plurality of different areas within automated induction system as new information is obtained throughout ongoing operations.

In-feed conveyor engine 611 is operable to make decisions regarding control of an in-feed conveyor (e.g. in-feed conveyor 550) and/or generate control instructions or signals for the in-feed conveyor. In-feed conveyor engine 611 may determine controls based on status information associated with at least one other system component such as status information obtained from status engine 605. In one aspect, in-feed conveyor engine 611 determines control based on status information associated with at least one of a first and second pick conveyor. For example, if status information indicates that there is a need for objects in a first and/or second pick area, control signal(s) may be generated to control the in-feed conveyor to introduce new objects to the automated induction system (e.g. to the first pick conveyor 403a or 520).

First pick conveyor engine 613 is operable to make decisions regarding control of a first pick conveyor (e.g. the first pick conveyor 403a or 520) and/or generate control instructions or signals for the first pick conveyor. First pick conveyor engine 613 may determine controls based on status information associated with at least one other system component such as status information obtained from status engine 605. In one aspect, first pick conveyor engine 613 determines control based on status information associated with at least one of in-feed conveyor, first pick area/conveyor (e.g. whether objects are present), first robot, and second pick conveyor/area. Prior to activating first pick conveyor with control instructions/signals it may be necessary to verify adjacent components are prepared for a corresponding action. For example, prior to activating first pick conveyor, it may be necessary to verify at least one of: the second pick conveyor/area is prepared to receive objects moving from the first pick conveyor and that a pick is not currently in progress by the first robot. This is merely one exemplary consideration and first pick conveyor engine 613 may use other information in determining control of first pick conveyor.

Second pick conveyor engine 615 is operable to make decisions regarding control of a second pick conveyor (e.g. second pick conveyor 403b or 530) and/or generate control instructions or signals for the second pick conveyor. Second pick conveyor engine 615 may determine controls based on status information associated with at least one other system component such as status information obtained from status engine 605. In one aspect, second pick conveyor engine 615 determines control based on status information associated with at least one of in-feed conveyor, second robot, second pick conveyor/area (e.g. whether objects are present), and second place area conveyor/area. For example, prior to activating second pick conveyor, it may be necessary to verify at least one of: that there are not pickable objects in the second pick area which would incorrectly be moved into a rejection receptacle and that a pick is not currently in progress by the second robot. This is merely one exemplary consideration and second pick conveyor engine 615 may use other information in determining control of second pick conveyor. In one aspect, second pick conveyor engine 615 may generally drive control operations on the pick side of the automated induction system such that second pick area/conveyor is consistently provided with pickable objects so that second robot incurs minimal downtime waiting to perform its next picking action. This can provide increased throughput by consistently allowing both robots to perform picking operations with less waiting between picks. This, in combination with buffer area/conveyor may further increase throughput by further reducing waiting or downtime associated with robots waiting to execute their next picking operation.

First place conveyor engine 617 is operable to make decisions regarding control of a first place conveyor (e.g. first place conveyor 405*a* or 524) and/or generate control instructions or signals for the first place conveyor. First place conveyor engine 617 may determine controls based on status information associated with at least one other system component such as status information obtained from status engine 605. In one aspect, first place conveyor engine 617 determines control based on status information associated with at least one of first robot and first buffer area/conveyor. For example, prior to activating first place conveyor, it may be necessary to verify at least one of: the buffer conveyor/area is prepared to receive objects moving from the first place conveyor and that a place operation is not currently in progress by the first robot to place an object on the first place conveyor. This is merely one exemplary consideration and first place conveyor engine 617 may use other information in determining control of first place conveyor.

Second place conveyor 619 is operable to make decisions regarding control of a second place conveyor (e.g. second place conveyor 405*b* or 534) and/or generate control instructions or signals for the second place conveyor. Second place conveyor engine 619 may determine controls based on status information associated with at least one other system component such as status information obtained from status engine 605. In one aspect, second place conveyor engine 619 determines control based on status information associated with at least one of second robot and induction conveyor. For example, prior to activating second place conveyor, it may be necessary to verify at least one of: the induction conveyor is prepared to receive objects moving from the second place conveyor and that a place operation is not currently in progress by the second robot to place an object on the second place conveyor. This is merely one exemplary consideration and second place conveyor engine 619 may use other information in determining control of second place conveyor.

Buffer conveyor engine 621 is operable to make decisions regarding control of a buffer conveyor (e.g. buffer conveyor

526) and/or generate control instructions or signals for the buffer conveyor. Buffer conveyor engine 621 may determine controls based on status information associated with at least one other system component such as status information obtained from status engine 605. In one aspect, buffer conveyor engine 621 determines control based on status information associated with at least one of second place conveyor/area and second robot. For example, prior to activating buffer conveyor, it may be necessary to verify at least one of: the second place area conveyor is prepared to receive objects moving from the buffer conveyor and that a place operation is not currently in progress by the second robot to place an object on the second place conveyor. This is merely one exemplary consideration and buffer conveyor engine 621 may use other information in determining control of buffer conveyor.

Induction conveyor engine 623 is operable to make decisions regarding control of an induction conveyor (e.g. induction conveyor 540) and/or generate control instructions or signals for the induction conveyor. Induction conveyor engine 623 may determine controls based on status information associated with at least one other system component such as status information obtained from status engine 605. In one aspect, induction conveyor engine 623 determines control based on status information associated with at least second place conveyor. In one aspect, induction conveyor engine 623 determines control information based on an external component such as a downstream induction component indicating an inducted object was returned or rejected in which case the object may be passed in reverse direction back through the induction, place and buffer conveyors to a rejection receptacle (e.g. receptacle 554).

Although described herein with respect to object processing in a downstream fashion (i.e. object flow moving from in-feed conveyor to induction conveyor), additional control considerations may evaluate upstream status information, such as when object flow needs to be reversed due to object rejection or exceptions.

FIGS. 7A-A and 7A-B illustrate an exemplary control logic flow for various components of a serial dual arm robotic induction system according to one embodiment of the invention. The logic may comprise inter-system dependencies and provide inter-system communication between the various system components in order to facilitate coordinate picking operations amongst the deconflicted robots. In one aspect, control of one system component is determined based on the status of another system component and/or based on information obtained from another system component. The indications and requests described below may comprise signals or other communications handled through a programmable logic controller (or other suitable control components/circuitry including, but not limited to those described above in association with FIG. 6) to coordinate interactions between the various system components. Although described herein as digital signals in some embodiments, other signal forms may be used as appropriate depending on the particular control circuitry being used as would be apparent to one of ordinary skill in the art. In this exemplary configuration, a robot may receive an indication 750 from a pick conveyor that the pick conveyor is ready for a pick operation. This may involve a determination 751 that an object is present on the pick conveyor such as via a sensor array associated with the pick conveyor (e.g. arranged along the pick conveyor) and/or via detection of an object via a vision system. Upon receiving the indication 750, the robot may provide an indication 752 to the pick conveyor to lock or hold the pick conveyor in position thereby preventing movement of the pick conveyor. This may be referred to as latching between the robot and pick conveyor such that movement of the pick conveyor is constrained until the robot provides a release indication. Once the pick conveyor is locked, an indicator 753 may be sent to a vision system requesting identification of a pick object. In response, the vision system may generate pick instructions 754 based on analysis of the pick scene associated with the pick conveyor. Upon receipt of the pick instructions 755, the robot executes a pick operation to pick the object. Once an object is picked, the robot may provide an indication 756 to the pick conveyor thereby indicating the pick conveyor may continue indexing operations to move the conveyor as appropriate. In other words, after a pick operation the robot unlatches the pick conveyor so the pick conveyor movement is no longer constrained.

Prior to placement of the object by the robot, an indicator 757 may be sent to the place conveyor indicating the robot is ready to place an object. In one aspect, the indicator 757 may comprise a request to place wherein the place conveyor may respond indicating whether it is ready to receive an object. As with the pick conveyor above, the robot and place conveyor may use a latching approach to ensure the place conveyor does not move while an object placement operation is taking place by the robot. Once the object has been placed, placement can be verified by at least one of the vision system and via sensors arranged along the place conveyor operable to detect the presence of an object. Once an object has been placed and placement/presence verified, the place conveyor may be unlatched from the robot thereby allowing for indexing of the place conveyor to move objects along the conveyor as appropriate. The above may be applied to a plurality of pick conveyors, robots, vision systems, and place conveyors. Examples of overall component control, place conveyance control, and pick conveyance control processes are described in further detail below.

FIG. 7B illustrates an exemplary process for controlling components of a serial dual arm robotic induction system in an automated robotic picking environment according to one embodiment of the invention. The process comprises obtaining status information associated with a first pick area 701, obtaining status information associated with a second pick area 702, obtaining status information associated with a first place area 703, obtaining status information associated with a second place area 704, and obtaining status information associated with a first buffer area 705, generating a control signal for at least one conveyor based on the obtained status information 706, transmitting the control signal to the at least one conveyor 707. The process steps described herein may be performed in association with a system such as that described in FIG. 2-6 above or in association with a different system operable to perform essentially the same functions. The process may comprise additional steps, fewer steps, and/or a different order of steps without departing from the scope of the invention as would be apparent to one of ordinary skill in the art.

At step 701, the process may comprise obtaining status information associated with a first pick area. Status information may comprise information associated with a total number of objects present in the first pick area, for example total objects present on a first conveyance system. Status information may comprise information associated with a total number of objects which are determined to be pickable objects. Pickable objects may comprise objects which have been identified (e.g. by a vision system or the like) as objects capable of being picked and moved by an associated robot (e.g. a robotic arm in proximity to the first pick area). Status information may comprise information associated with a total number of objects which are determined to be exception objects or rejection objects. Exception or rejection objects may comprise objects which have not been identified as pickable objects and therefore are not suitable for picking by a robot. In general, these exception or rejection objects may require additional input or intervention in order to be properly handled. However, rather than delaying picking operations, these objects may be allowed to pass through the pick area ultimately reaching a rejection area or receptacle where the necessary further handling can be addressed. Status information may comprise location information (e.g. coordinate data) associated with objects located in the first pick area. Status information may comprise an indication that a pick is currently in progress (and therefore the first conveyor should not be moved as this could disrupt the picking process). Status information may comprise an index value indicating the status of the first pick area/first conveyor. For example, a first index value may indicate that pickable objects are present, a second index value may indicate that no pickable objects are present. This is merely exemplary and additional index values may be used to indicate other status information, such as an index value indicating the presence of rejection or exception objects, an index value indicating a pick is in progress, etc. In one aspect, index value(s) may be used provide an indication of the location of an object along the length of the conveyor wherein the index values change over time (e.g. increase) in association with the changing location of the object changes as it moves along the conveyor.

At step 702, the process may comprise obtaining status information associated with a second pick area. This status information may generally be the same as the information second pick area however directed to objects located in a second pick area (such as on a second conveyance system). Status information may comprise information associated with a total number of objects present in the second pick area, for example total objects present on a second conveyance system. Status information may comprise information associated with a total number of objects which are determined to be pickable objects. Pickable objects may comprise objects which have been identified (e.g. by a vision system or the like) as objects capable of being picked and moved by an associated robot (e.g. a robotic arm in proximity to the second pick area). Status information may comprise information associated with a total number of objects which are determined to be exception objects or rejection objects. Exception or rejection objects may comprise objects which have not been identified as pickable objects and therefore are not suitable for picking by a robot. In general, these exception or rejection objects may require additional input or intervention in order to be properly handled. However, rather than delaying picking operations, these objects may be allowed to pass through the pick area ultimately reaching a rejection area or receptacle where the necessary further handling can be addressed. Status information may comprise location information (e.g. coordinate data) associated with objects located in the second pick area. Status information may comprise an indication that a pick is currently in progress (and therefore the second conveyor should not be moved as this could disrupt the picking process). Status information may comprise an index value indicating the status of the second pick area/second conveyor. For example, a first index value may indicate that pickable objects are present, a second index value may indicate that no pickable objects are present. This is merely exemplary and additional index values may be used to indicate other status information, such as an index value indicating the presence of rejection or exception objects, an index value indicating a pick is in progress, etc. In one aspect, index value(s) may be used provide an indication of the location of an object along the length of the conveyor wherein the index values change over time (e.g. increase) in association with the changing location of the object changes as it moves along the conveyor.

At step 703, the process may comprise obtaining status information associated with a first place area, such as a first place conveyance system or conveyor. Status information may comprise information associated with a total number of objects present in the first place area. Status information may comprise information associated with placement verification information (e.g. indicating that an object was successfully or appropriately placed within the place area). Status information may comprise information associated with the location (e.g. coordinates) of the object within the first place area. Status information may comprise information associated with a total number of objects which are determined to be exception objects or rejection objects. Exception or rejection objects may comprise objects which have been improperly placed within the first place area. For example, a robot may pick an incorrect object or incorrectly place an object in which case it may be necessary to reject the object rather than passing the object on through along the induction pathway. As another example, an object may be determined as rejected or improperly inducted downstream (e.g. at or by the induction system/conveyor) in which case the object may be passed back to the picking/sorting system along the place areas/conveyors. In this scenario, the rejected object may be continually passed back through the place area(s) to a rejection receptacle (e.g. rejection receptacle 154) where it can be dealt with later and still allowing picking/sorting operations to continue rather than pausing picking operations until the rejection object has been otherwise handled. In one aspect, the first place area may be capable of receiving one object (e.g. depending on the size of the place area and the object and/or control limitations/preferences). In this scenario, it may be necessary to move the object from the first place area to at least the first buffer area in order to allow for placement operations to continue. In one aspect, the first place area may be capable of receiving a plurality of objects (e.g. depending on the size of the place area and the object and/or control limitations/preferences) prior to requiring the objects to be moved to the buffer area or beyond. Status information may comprise an indication that an object placement is currently in progress (and therefore the conveyor should not be moved as this could disrupt the placement process). Status information may comprise an index value indicating the status of the first place area/conveyor. For example, a first index value may indicate that placed objects are present, a second index value may indicate that no placed objects are present. This is merely exemplary and additional index values may be used to indicate other status information, such as an index value indicating the presence of rejection or exception objects, an index value indicating object placement is in progress, etc. In one aspect, index value(s) may be used provide an indication of the location of an object along the length of the conveyor wherein the index values change over time (e.g. increase) in association with the changing location of the object changes as it moves along the conveyor.

At step 704, the process may comprise obtaining status information associated with a second place area. This status information may generally be the same as the information associated with the first place area however directed to objects located in a second place area (such as on a second place conveyance system). Status information may comprise information associated with a total number of objects present in the second place area. Status information may comprise information associated with placement verification information (e.g. indicating that an object was successfully or appropriately placed within the place area by a robot). Status information may comprise information associated with the location (e.g. coordinates) of the object within the second place area. Status information may comprise information associated with a total number of objects which are determined to be exception objects or rejection objects. Exception or rejection objects may comprise objects which have been improperly placed within the second place area. For example, a robot may pick an incorrect object or incorrectly place an object in which case it may be necessary to reject the object rather than passing the object on through along the induction pathway. As another example, an object may be determined as rejected or improperly inducted downstream (e.g. at or by the induction system/conveyor) in which case the object may be passed back to the picking/ sorting system along the place areas/conveyors. In this scenario, the rejected object may be continually passed back through the place area(s) to a rejection receptacle (e.g. rejection receptacle 154) where it can be dealt with later and still allowing picking/sorting operations to continue rather than pausing picking operations until the rejection object has been otherwise handled. In one aspect, the second place area may be capable of receiving one object (e.g. depending on the size of the place area and the object and/or control limitations/preferences). In this scenario, it may be necessary to move the object out of the second place area in order to allow for placement operations to continue (e.g. moving the object from the second place area downstream to an induction conveyance system. In one aspect, the second place area may be capable of receiving a plurality of objects (e.g. depending on the size of the place area and the object and/or control limitations/preferences) prior to requiring the objects to be moved downstream. Status information may comprise an indication that an object placement is currently in progress (and therefore the conveyor should not be moved as this could disrupt the placement process). Status information may comprise an index value indicating the status of the second place area/conveyor. For example, a first index value may indicate that placed objects are present, a second index value may indicate that no placed objects are present. This is merely exemplary and additional index values may be used to indicate other status information, such as an index value indicating the presence of rejection or exception objects, an index value indicating object placement is in progress, etc. In one aspect, index value(s) may be used to provide an indication of the location of an object along the length of the conveyor wherein the index values change over time (e.g. increase) in association with the changing location of the object changes as it moves along the conveyor.

At step 705, the process may comprise obtaining status information associated with a first buffer area. Status information may comprise information associated with a total number of objects present in the buffer area (e.g. objects received from an adjacent or nearby conveyance system). Status information may comprise information associated with the location (e.g. coordinates) of the object within the first buffer area. Status information may comprise information associated with a total number of objects which are determined to be exception objects or rejection objects. Exception or rejection objects may comprise objects which are present in the buffer area and awaiting further handling to address the rejection/exception issue (e.g. an object being passed back from the induction system and en route to a rejection receptacle, such as receptacle 154). Status information may comprise an index value indicating the status of the buffer area/conveyor. For example, a first index value may indicate that an object to be inducted is present and a second index value may indicate that no objects are present. This is merely exemplary and additional index values may be used to indicate other status information, such as the presence of rejection or exception objects, etc. In one aspect, index value(s) may be used to provide an indication of the location of an object along the length of the conveyor wherein the index values change over time (e.g. increase) in association with the changing location of the object changes as it moves along the conveyor. Although only one buffer area is discussed above, additional buffer areas/conveyance systems may be used between the first and second place areas/conveyance systems as would be apparent to one of ordinary skill in the art. The benefit of additional buffer areas is that it may allow moving objects from the first pick area to the place area and subsequently along the multiple buffer areas without the need to wait for operations occurring in the second pick/place areas which could otherwise delay operations in the first pick/place area. However, additional buffer areas may require additional space in an environment which may already have space constraints. Ultimately, the number of buffer areas may be adjusted based on the above factors as would be apparent to one of ordinary skill in the art.

At step 706, the process may comprise generating a control signal for at least one conveyor based on the obtained status information. In general, control signals may be generated based on one or more elements of status information. In some aspects, a single element of status information may be sufficient to generate a control signal. For example, when the status information of the second place area indicates an object is present, this may be sufficient information to generate a control signal for the second place conveyor to move the object to the induction conveyor thereby making space in the second place area to receive a new object (e.g. from buffer area, from robot placement of an object moved from the second pick area, etc.). In some aspects, multiple elements of status information may be required in order to generate an appropriate control signal(s). In general, the downstream (i.e. towards induction) components will dictate control of upstream components. For example, a control signal for the first place conveyor may be dependent on the status information of one or more downstream components/areas in order to avoid object collisions. In particular, a control signal to activate the first place conveyor to pass an object downstream (i.e. towards induction) may require evaluating status information associated with at least one of the buffer area and the second place conveyor. If the status information associated with buffer area indicates no object is present, then a control signal may be generated for the first place conveyor to advance the object downstream (i.e. to the buffer conveyor). If the status information associated with the buffer area indicates an object is present, then additional status information associated with the second place conveyor is needed in order to generate an appropriate control signal. If the second place conveyor status information indicates no object is present and/or no object placement is in progress, then a control signal(s) may be generated to advance all of the first place conveyor, buffer conveyor and second place conveyor to move the object(s) to induction. Similar approaches may be applied on the pick side of the picking/sorting arrangement. In one aspect, the control signals may be configured to yield the activation of two adjacent conveyors such that a first conveyor moves an object towards a second adjacent conveyor which is activated in sync with the first conveyor in order to receive and continue moving the object onto and along the second conveyor. In general, the process may apply a hierarchical approach such that downstream components control or otherwise dictate upstream operations. This not only prevents object collisions, but also allows the for the generation of control signals in such a way that the downstream components drive the process and avoid being starved or deprived of objects which leads to an overall higher throughput of objects as opposed to an arrangement which prioritizes the upstream components or provides no prioritization.

In one aspect, the control signal may be based on the object location information wherein the control signal indicates the duration of time the conveyor should be activated in order to move the object from the current conveyor to the next adjacent object handling component (e.g. another conveyor, etc.). In one embodiment, the duration may be sufficient to fully cycle the conveyance system such that it will have moved an entire length of the conveyor. In one embodiment, the duration may be determined based on the location of the object such that the conveyor runs only for the amount of time necessary to move the object to the next object handling component/conveyor. As an alternative to the full cycle option, this may reduce time spent waiting for the conveyance systems to be ready for the next pick/place operation thereby improving the overall efficiency and speed of object throughput.

At step 707, the process may comprise transmitting the control signal(s) to at least one conveyor. Once the control signal(s) has/have been generated, the signal(s) may be sent to the corresponding conveyors in order to render the appropriate movement of the conveyors and corresponding objects located thereon.

Subsequent to transmitting the control signal to at least one conveyor, the respective conveyor(s) may be activated (e.g. by implementing the control signal) to move objects present on the respective conveyor(s). Upon successful activation of the corresponding conveyors, the status information of the conveyors may be updated accordingly. This may comprise updating an index value to reflect the new status of the conveyor, such as changing the index value from a value indicative of an object being present to an index value indicative of no object present. This updated status information may then be used to influence further decisions regarding the generation of subsequent control signals. Although presented as an ordered set of steps, each step may be repeated a plurality of times without necessarily repeating the entire process and all other steps. For example, the status information associated with each area may change more dynamically such that status information for one area is obtained more frequently than status information for another area and such change may immediately be used to generate control signals without necessarily requiring the obtaining of status information associated with all of the listed steps. For example, controlling a downstream component such as a second place conveyor in the second place area which is directly adjacent to the induction conveyor in the above exemplary embodiment generally does not require status information for the other areas as advancement of the conveyor will pass the object on to induction without risk of interfering with objects in the other areas. Therefore, the obtaining of status information for this area (e.g. step 304) may occur without performing the other steps of 301, 302, 303 and 305. However, this is not to say that that information

25 will not be obtained in controlling the second place conveyor as optimal performance of the overall system may benefit from such information. For example, prior to generating a control signal for the second place conveyor it may be beneficial to know when an object is present on a first place conveyor and/or buffer conveyor in which case it would be beneficial to activate the second place conveyor for a sufficient duration of time to pass the corresponding objects on the first place conveyor and/or buffer conveyor all the way through to induction conveyor.

Any of the above mentioned conveyors may be subdivided into a plurality of zones. The zones may comprise at least one of a physical division and a virtual division to separate different segments of the conveyor wherein these zones may be used to affect control of object picking, placement and movement along the conveyors. For example, a pick conveyor may be divided into three zones where a middle or second zone serves as a main picking area while the first and third zones serve as priming areas for objects to accumulate or remain before and after the main pick area. In one aspect, the third zone of a first pick conveyor may serve as a priming area for a second, downstream pick conveyor. Similarly, on the place conveyance side, each place conveyor or buffer conveyor may be divided into a plurality of zones. For example, a place conveyor may be divided into three zones where a first zone serves as a main object placement area while the second and third zones serve as temporary object holding zones for previously placed objects until the place conveyor can be indexed to move the objects downstream to the next conveyor (e.g. a buffer conveyor or second place conveyor). In this way, since each conveyor is able to receive and convey a plurality of objects as determined by the zones, a first robot, such as an upstream robot, may continue to pick and place objects on the place conveyor which may in turn move objects to a buffer conveyor as necessary to allow the first robot to continue picking and placing objects without frequently needing to wait for a second downstream robot to complete placement operations. This arrangement aids in deconfliction of the robots allowing them to operate independently based on availability of space along their dedicated placement conveyors as opposed to configurations relying on a shared picking area and/or shared placement area.

The use of three zones in the above description is merely for purposes of illustration and any number of zones may be used without departing in scope from the invention including using a different number of zones for different conveyors.

FIG. 7C illustrates an exemplary process for place conveyance control in a serial dual arm robotic induction system in an automated robotic picking environment according to one embodiment of the invention. The process comprises obtaining status information associated with a first place conveyor 711, obtaining status information associated with a second place conveyor 712, obtaining status information associated with a first robot 713, optionally obtaining status information associated with a buffer conveyor 714, generating a control signal for at least one conveyor based on the obtained status information 715, and transmitting the control signal to the at least one conveyor 716.

At 711, status information associated with a first place conveyor may be obtained. The status information may comprise a digital signal. The status information may be associated with an index value. The status information may indicate at least one of the presence of an object on the first place conveyor and a location of the object along the length of the first place conveyor when an object is present on the first place conveyor. The status information may indicate that the place conveyor is ready to receive an object from a robot. The first place conveyor may be dedicated to receiving objects placed by a first robot. The first place conveyor may be dedicated to receiving objects placed by a first robot wherein the objects were picked from a first pick conveyor dedicated to the first robot. The first place conveyor may be arranged in parallel to the first pick conveyor such that the direction of object movement along the first pick conveyor is substantially parallel to the direction of object movement along the first place conveyor. The first place conveyor may comprise a plurality of logically determined zones. The sizes of the zones may be determined such that they are able to contain an object of a typical size of the objects being handled by the dual arm robotic induction system. The sizes of the zones may be determined such that they are able to contain an object of a maximum size of the objects being handled by the dual arm robotic induction system. The sizes of the zones may be determined such that they are able to contain an object of a minimum size of the objects being handled by the dual arm robotic induction system. The status information may provide an indication of a corresponding zone(s) comprising an object placed on the place conveyor. The place conveyor may be associated with at least one sensor or sensor array arranged along the conveyor (e.g. along the direction of object movement). The status information may be determined based on at least one sensor input thereby providing an indication of the location of an object along the place conveyor.

At 712, status information associated with a second place conveyor may be obtained. The status information may comprise a digital signal. The status information may be associated with an index value. The status information may indicate at least one of the presence of an object on the second place conveyor and a location of the object along the length of the second place conveyor when an object is present on the second place conveyor. The status information may indicate that the place conveyor is ready to receive an object from a robot. The second place conveyor may be dedicated to receiving objects placed by a second robot. The second place conveyor may be dedicated to receiving objects placed by a second robot wherein the objects were picked from a second pick conveyor dedicated to the second robot. The second place conveyor may be arranged in parallel to the second pick conveyor such that the direction of object movement along the second pick conveyor is substantially parallel to the direction of object movement along the second place conveyor. The second place conveyor may comprise a plurality of logically determined zones. The sizes of the zones may be determined such that they are able to contain an object of a typical size of the objects being handled by the dual arm robotic induction system. The sizes of the zones may be determined such that they are able to contain an object of a maximum size of the objects being handled by the dual arm robotic induction system. The sizes of the zones may be determined such that they are able to contain an object of a minimum size of the objects being handled by the dual arm robotic induction system. The status information may provide an indication of a corresponding zone(s) comprising an object placed on the place conveyor. The conveyor may be associated with at least one sensor or sensor array arranged along the place conveyor (e.g. along the direction of object movement). The status information may be determined based on at least one sensor input thereby providing an indication of the location of an object along the place conveyor.

At 713, status information associated with a first robot may be obtained. The status information may comprise a digital signal. The status information may comprise an indication that the robot is requesting to execute a place operation on the first place conveyor. The status information may indicate a virtual latching between the first robot and the first place conveyor such that the place conveyor is constrained from moving during a placement operation by the first robot. The status information may comprise an indication that a picking operation is being executed by the first robot.

At 714, status information associated with a buffer conveyor may be obtained. The status information may comprise a digital signal. The status information may be associated with an index value. The status information may indicate at least one of the presence of an object on the buffer conveyor and a location of the object along the length of the buffer conveyor when an object is present on the conveyor. The buffer conveyor may be positioned in line with and between (i.e. in series with) the first and second place conveyors. The status information may indicate that the buffer conveyor is ready to receive an object from an adjacent conveyor (e.g. the upstream first place conveyor or the downstream second place conveyor such as in the case of handling rejection or exception objects). The buffer conveyor may comprise a plurality of logically determined zones. The sizes of the zones may be determined such that they are able to contain an object of a typical size of the objects being handled by the dual arm robotic induction system. The sizes of the zones may be determined such that they are able to contain an object of a maximum size of the objects being handled by the dual arm robotic induction system. The sizes of the zones may be determined such that they are able to contain an object of a minimum size of the objects being handled by the dual arm robotic induction system. The status information may provide an indication of a corresponding zone(s) comprising an object placed on the buffer conveyor. The buffer conveyor may be associated with at least one sensor or sensor array arranged along the buffer conveyor (e.g. along the direction of object movement). The status information may be determined based on at least one sensor input thereby providing an indication of the location of an object along the buffer conveyor. In one aspect, a buffer conveyor may not be required depending on the environment and nature of objects being sorted/inducted. For example, a first place conveyor divided into multiple zones may be sufficient to maintain the necessary throughput without significantly adverse waiting time. In one aspect, the first place conveyor may be adjusted in size and number of virtual zones to provide essentially the same or similar operations as a separate first place conveyor combined with a buffer conveyor as would be apparent to one of ordinary skill in the art.

At 715, a control signal for at least one conveyor may be generated based on the obtained status information. Generating a control signal may be associated with determining conveyor advancement criteria. Conveyor advancement criteria may comprise at least one of: a) processing a digital signal to determine that there is sufficient space along the first place conveyor to move an object present on the first place conveyor along the first conveyor towards the second place conveyor or buffer conveyor when present; b) processing a digital signal to determine that there is sufficient space along the second place conveyor to receive an object from the first place conveyor or buffer conveyor when present; and c) processing a digital signal to determine that an object placement operation associated with the first robot and first placement conveyor is not in progress.

The control signal(s) may comprise a signal to index or advance the conveyor. The control signal(s) may comprise a signal to control at least one of a speed and a duration of movement of the at least one place conveyor. At least one of the speed and duration may be determined based on a sensor input, wherein the sensor is operable to provide information associated with the location of at least one object present on the at least one place conveyor and provide an indication of the progress of object movement along the conveyor and/or whether the object has passed a certain location (e.g. the end of the conveyor, a zone, etc.) The control signal may comprise a signal to stop the conveyor. A signal to stop the conveyor may be determined based on a sensor input such as a sensor array arranged along the length of the conveyor. The sensor array may determine the location of the object along the conveyor and/or a distance traveled by the object which can be used to determine when a stop signal should be generated and transmitted to the conveyor.

The control signal(s) may comprise a control signal to advance the first place conveyor to move an object from a first zone of the first place conveyor to a second zone of the first place conveyor. The control signal(s) may comprise a control signal to advance the first place conveyor to move an object from a first zone of the first place conveyor to the second place conveyor or buffer conveyor when present. The control signal(s) may comprise a control signal to advance the second place conveyor to at least one of receive an object from the first place conveyor and move an object from a first zone of the second place conveyor to the second zone of the second place conveyor. The control signal(s) may comprise a control signal to advance the buffer conveyor to at least one of move an object from a first zone of the buffer place conveyor to a second zone of the buffer place conveyor, receive an object from the first place conveyor, and move an object from the buffer place conveyor to the second place conveyor. In one aspect, the control signal(s) may comprise control signals to reverse the conveyors such as when handling exception or rejection objects which are to be passed opposite the direction of the induction conveyor to a designated exception or rejection handling area. A combination of the above control signals may be generated as would be appropriate for a given scenario to move and/or stop a plurality of conveyors as would be apparent to one of ordinary skill in the art.

At 716, the control signal may be transmitted to the at least one conveyor. Once the control signal(s) has/have been generated, the signal(s) may be sent to the corresponding conveyors in order to render the appropriate movement of the conveyors and corresponding objects located thereon.

FIG. 7D illustrates an exemplary process for pick conveyance control in a serial dual arm robotic induction system in an automated robotic picking environment according to one embodiment of the invention. The process comprises obtaining status information associated with a first pick conveyor 721, obtaining status information associated with a second pick conveyor 722, obtaining status information associated with a first robot 723, obtaining status information associated with a second robot 724, generating a control signal for at least one conveyor based on the obtained status information 725, and transmitting the control signal to the at least one conveyor 726.

At 721, status information associated with a first pick conveyor may be obtained. The status information may comprise a digital signal. The status information may be associated with an index value. The status information may indicate at least one of the presence of at least one object on the first pick conveyor and a location of at least one object along the length of the first pick conveyor. The status information may indicate that the pick conveyor is ready for an object to be picked by a robot. The status information may indicate that no pickable objects are present. The first pick conveyor may be dedicated to providing objects to be picked by a first robot. The first pick conveyor may be arranged in parallel to a first place conveyor such that the direction of object movement along the first pick conveyor is substantially parallel to the direction of object movement along the first place conveyor. The first pick conveyor may comprise a plurality of logically determined zones. The sizes of the zones may be determined such that they are able to contain an object of a typical size of the objects being handled by the dual arm robotic induction system. The sizes of the zones may be determined such that they are able to contain an object of a maximum size of the objects being handled by the dual arm robotic induction system. The sizes of the zones may be determined such that they are able to contain an object of a minimum size of the objects being handled by the dual arm robotic induction system. The status information may provide an indication of a corresponding zone(s) comprising an object. In one aspect, the zones may serve different purposes. For example, a first zone may serve as a priming area for objects to be picked by the first robot, a second zone may serve as the primary picking area for the first robot to pick objects, and a third zone may serve as a priming area for objects intended to be passed to a second pick conveyor. In this example, the second zone may be downstream of the first zone and the third zone downstream of the second zone. The pick conveyor may be associated with at least one sensor or sensor array arranged along the conveyor (e.g. along the direction of object movement). The status information may be determined based on at least one sensor input thereby providing an indication of the location of an object along the pick conveyor.

At 722, status information associated with a second pick conveyor may be obtained. The status information may comprise a digital signal. The status information may be associated with an index value. The status information may indicate at least one of the presence of at least one object on the second pick conveyor and a location of at least one object along the length of the second pick conveyor. The status information may indicate that the pick conveyor is ready for an object to be picked by a robot. The status information may indicate that no pickable objects are present. The second pick conveyor may be dedicated to providing objects to be picked by a second robot independent of the first robot. The second pick conveyor may be arranged in parallel to a second place conveyor such that the direction of object movement along the second pick conveyor is substantially parallel to the direction of object movement along the second place conveyor. The second pick conveyor may comprise a plurality of logically determined zones. The sizes of the zones may be determined such that they are able to contain an object of a typical size of the objects being handled by the dual arm robotic induction system. The sizes of the zones may be determined such that they are able to contain an object of a maximum size of the objects being handled by the dual arm robotic induction system. The sizes of the zones may be determined such that they are able to contain an object of a minimum size of the objects being handled by the dual arm robotic induction system. The status information may provide an indication of a corresponding zone(s) comprising an object. In one aspect, the zones may serve different purposes. For example, a first zone may serve as a priming area for objects intended to be picked by the second robot, a second zone may serve as the primary picking area for the second robot to pick objects, and a third zone may serve as a priming area for objects to be passed to a rejection or exception handling area. In this example, the second zone may be downstream of the first zone and the third zone downstream of the second zone. The pick conveyor may be associated with at least one sensor or sensor array arranged along the conveyor (e.g. along the direction of object movement). The status information may be determined based on at least one sensor input thereby providing an indication of the location of an object along the pick conveyor.

At 723, status information associated with a first robot may be obtained. The status information may comprise a digital signal. The status information may comprise an indication that the robot is requesting to execute a pick operation on the first pick conveyor. The status information may indicate a virtual latching between the first robot and the first pick conveyor such that the pick conveyor is constrained from moving during a picking operation by the first robot. The status information may comprise an indication that a picking operation is being executed by the first robot. The status information may comprise an indication that a picking operation by the first robot is not ongoing (e.g. has concluded) and thus the first pick conveyor may move (e.g. is not latched with the first robot).

At 724, status information associated with a second robot may be obtained. The status information may comprise a digital signal. The status information may comprise an indication that the robot is requesting to execute a pick operation on the second pick conveyor. The status information may indicate a virtual latching between the second robot and the second pick conveyor such that the pick conveyor is constrained from moving during a picking operation by the second robot. The status information may comprise an indication that a picking operation is being executed by the second robot. The status information may comprise an indication that a picking operation by the second robot is not ongoing (e.g. has concluded) and thus the second pick conveyor may move (e.g. is not latched with the second robot).

At 725, a control signal for at least one conveyor may be generated based on the obtained status information. Generating a control signal may be associated with determining that a picking operation is not ongoing for a given pick conveyor or that the pick conveyor is not virtually latched with a robot. Generating a control signal may be associated with determining that there is a need to advance at least one pick conveyor to provide objects for picking by at least one of the first and second robot. For example, when the second robot and/or pick conveyor are starved (i.e. have no pickable objects), a control signal may be generated to advance at least one of the pick conveyors to move objects to the second pick conveyor so that picking operations can resume by the second robot on the second pick conveyor. Generating a control signal may be associated with determining there is sufficient space along the second pick conveyor to move an object present on the first pick conveyor along the first conveyor to the second pick conveyor. Generating a control signal may be associated with determining there is at least one rejection or exception object present on at least one of the first and second pick conveyors which are to be passed through along the pick conveyors to a rejection/exception handling area.

The control signal(s) may comprise a signal to index or advance the conveyor. The control signal(s) may comprise a signal to control at least one of a speed and a duration of movement of the at least one pick conveyor. In one aspect the speed control is variable and is determined based on at least one of the speed of an in-feed conveyor and the density of objects on the in-feed conveyor and/or first pick conveyor such that objects of a higher density on an upstream conveyor can be dispersed to a lower density along the downstream pick conveyor(s) thereby allowing for increased case of automated object identification and object picking with less need for manual intervention and operational downtime. At least one of the speed and duration may be determined based on a sensor input, wherein the sensor is operable to provide information associated with the location of at least one object present on the at least one pick conveyor and provide an indication of the progress of object movement along the conveyor(s) and/or whether the object has passed a certain location (e.g. the end of the conveyor, a zone, etc.) The control signal may comprise a signal to stop the pick conveyor(s). A signal to stop the pick conveyor(s) may be determined based on a sensor input such as a sensor array arranged along the length of the conveyor. The sensor array may determine the location of the object along the conveyor and/or a distance traveled by the object which can be used to determine when a stop signal should be generated and transmitted to the conveyor.

The control signal(s) may comprise a control signal to advance the first pick conveyor to move an object from a first zone of the first pick conveyor to a second zone of the first pick conveyor. The control signal(s) may comprise a control signal to advance the first pick conveyor to move an object from a first zone of the first pick conveyor to the second pick conveyor. The control signal(s) may comprise a control signal to advance the second pick conveyor to at least one of receive an object from the first pick conveyor and move an object from a first zone of the second pick conveyor to the second zone of the second pick conveyor. In one aspect, the control signal(s) may comprise control signals to reverse the conveyors such as when handling exception or rejection objects which are to be passed in the opposite the direction, for example, to an upstream exception or rejection handling area. A combination of the above control signals may be generated as would be appropriate for a given scenario to move and/or stop a plurality of conveyors as would be apparent to one of ordinary skill in the art.

At 726, the control signal may be transmitted to the at least one conveyor. Once the control signal(s) has/have been generated, the signal(s) may be sent to the corresponding conveyors in order to render the appropriate movement of the conveyors and corresponding objects located thereon.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the control system 203 and subcomponents thereof may be and/or comprise computing hardware and/or software as described herein in association with FIGS. 8-11. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 22. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

In some embodiments, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise webenabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung systemon-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for place conveyance control in serial dual arm robotic induction systems, the computer implemented method comprising:

obtaining a first digital signal indicating a status of a first place conveyor, the first place conveyor dedicated to receiving objects from a first robot, wherein the first digital signal is associated with a first index value indicating at least one of the presence of an object on the first place conveyor and a location of the object along the length of the first place conveyor when an object is present on the first place conveyor;

obtaining a second digital signal indicating a status of a second place conveyor, the second place conveyor located between the first place conveyor and an induction conveyor where objects moving along the first and second conveyors are inducted, the second place conveyor operable to receive objects from the first place conveyor, wherein the second digital signal is associated with a second index value indicating at least one of the presence of an object on the second place conveyor and a location of the object along the length of the second place conveyor when an object is present on the second place conveyor;

obtaining a third digital signal indicating a status of the first robot; and providing a control signal to at least one of the place conveyors to control operation of the at least one place conveyor, the control signal generated based on at least one of the first digital signal, second digital signal, and third digital signal.

2. The computer implemented method according to claim 1, wherein providing a control signal comprises determining advancement criteria for the first place conveyor have been met, wherein determining the advancement criteria comprises at least one of:

a) processing the first digital signal to determine that there is sufficient space along the first place conveyor to move an object present on the first place conveyor along the first conveyor towards the second place conveyor;

b) processing the second digital signal to determine that there is sufficient space along the second place conveyor to receive an object from the first place conveyor; and c) processing the third digital signal to determine that an object placement operation associated with the first placement conveyor is not in progress.

3. The computer implemented method according to claim 1, wherein the first place conveyor comprises a plurality of zones, wherein the first index value is associated with an object location associated with one of the zones.

4. The computer implemented method according to claim 3, wherein providing a control signal comprises providing a control signal to advance the first place conveyor to move an object from a first zone of the first place conveyor to a second zone of the first place conveyor.

5. The computer implemented method according to claim 3, wherein providing a control signal comprises providing a control signal to advance the first place conveyor to move an object from a first zone of the first place conveyor to the second place conveyor.

6. The computer implemented method according to claim 1, wherein the second place conveyor comprises a plurality of zones, wherein the second index value is associated with an object location associated with one of the zones.

7. The computer implemented method according to claim 6, wherein providing a control signal comprises providing a control signal to advance the second place conveyor to at least one of receive an object from the first place conveyor and move an object from a first zone of the second place conveyor to the second zone of the second place conveyor.

8. The computer implemented method according to claim 1, wherein at least one of the index values is determined based on at least one sensor input associated with the location of the object.

9. The computer implemented method according to claim 8, wherein the at least one sensor comprises a plurality of sensors arranged along the direction of object movement along at least one of the place conveyors.

10. The computer implemented method according to claim 1, wherein the first place conveyor is dedicated to receiving objects the first robot picks from a first pick conveyor, the first pick conveyor configured to move objects along a direction substantially parallel to the direction of object movement along the first place conveyor, the first pick conveyor defining a first pick area dedicated to the first robot.

11. The computer implemented method according to claim 1, wherein the second place conveyor is dedicated to receiving objects from a second robot, wherein the second robot picks objects from a second pick conveyor, the second pick conveyor configured to move objects along a direction substantially parallel to the direction of object movement along the second place conveyor, the second pick conveyor defining a second pick area dedicated to the second robot, the second robot operable independently of the first robot.

12. The computer implemented method according to claim 1, wherein the second place conveyor comprises a buffer conveyor positioned between the first place conveyor and a third place conveyor, wherein the third place conveyor is dedicated to receiving objects from a second robot.

13. The computer implemented method according to claim 1, further comprising obtaining a fourth digital signal indicating a buffer conveyor status, the buffer conveyor positioned between the first and second place conveyors along the direction of conveyor movement thereby serving as a buffer between the first and second place conveyors, wherein the fourth digital signal is associated with a third index value indicating at least one of the presence of an object on the buffer conveyor and a location of the object along the length of the buffer conveyor when an object is present on the buffer conveyor.

14. The computer implemented method according to claim 13, wherein the buffer conveyor comprises a plurality of zones, wherein the third index value is associated with an object location associated with one of the zones, and wherein providing a control signal comprises providing a control signal based on at least one of the first digital signal, second digital signal, and fourth digital signal in order to advance the buffer conveyor to at least one of move an object from a first zone of the buffer conveyor to a second zone of the buffer conveyor, receive an object from the first place conveyor, and move an object from the buffer conveyor to the second place conveyor.

15. The computer implemented method according to claim 1, wherein providing a control signal comprises providing a control signal to control at least one of a speed and a duration of movement of the at least one place conveyor.

16. The computer implemented method according to claim 15, wherein at least one of the speed and duration are determined based on a sensor input, wherein the sensor is operable to provide information associated with the location of at least one object present on the at least one place conveyor.

17. The computer implemented method according to claim 1, wherein the digital signals are obtained and processed using a programmable logic controller.

18. The computer implemented method according to claim 1, wherein providing a control signal comprises providing a control signal to move objects upstream away from an induction location.

19. A computing system for place conveyance control in serial dual arm robotic induction systems, the computing system comprising:

at least one computing processor; and memory comprising instructions that, when executed by the at least one computing processor, enable the computing system to:

obtain a first digital signal indicating a status of a first place conveyor, the first place conveyor dedicated to receiving objects from a first robot, wherein the first digital signal is associated with a first index value indicating at least one of the presence of an object on the first place conveyor and a location of the object along the length of the first place conveyor when an object is present on the first place conveyor;

obtain a second digital signal indicating a status of a second place conveyor, the second place conveyor located between the first place conveyor and an induction conveyor where objects moving along the first and second conveyors are inducted, the second place conveyor operable to receive objects from the first place conveyor, wherein the second digital signal is associated with a second index value indicating at least one of the presence of an object on the second place conveyor and a location of the object along the length of the second place conveyor when an object is present on the second place conveyor;

obtain a third digital signal indicating a status of the first robot; and provide a control signal to at least one of the place conveyors to control operation of the at least one place conveyor, the control signal generated based on at least one of the first digital signal, second digital signal, and third digital signal.

20. A non-transitory computer readable medium comprising instructions that when executed by a processor enable the processor to:

obtain a first digital signal indicating a status of a first place conveyor, the first place conveyor dedicated to receiving objects from a first robot, wherein the first digital signal is associated with a first index value indicating at least one of the presence of an object on the first place conveyor and a location of the object along the length of the first place conveyor when an object is present on the first place conveyor;

obtain a second digital signal indicating a status of a second place conveyor, the second place conveyor located between the first place conveyor and an induction conveyor where objects moving along the first and second conveyors are inducted, the second place conveyor operable to receive objects from the first place conveyor, wherein the second digital signal is associated with a second index value indicating at least one of the presence of an object on the second place conveyor and a location of the object along the length of the second place conveyor when an object is present on the second place conveyor;

obtain a third digital signal indicating a status of the first robot; and providing a control signal to at least one of the place conveyors to control operation of the at least one place conveyor, the control signal generated based on at least one of the first digital signal, second digital signal, and third digital signal.

\* \* \* \* \*